(12) United States Patent
Wang et al.

(10) Patent No.: US 9,922,376 B1
(45) Date of Patent: Mar. 20, 2018

(54) SYSTEMS AND METHODS FOR DETERMINING IMPACT CHAINS FROM A TAX CALCULATION GRAPH OF A TAX PREPARATION SYSTEM

(71) Applicant: Intuit Inc., Mountain View, CA (US)

(72) Inventors: Gang Wang, San Diego, CA (US); Kevin M. McCluskey, Carlsbad, CA (US); David A. Hanekamp, Jr., Carlsbad, CA (US); Luis F. Cabrera, Bellevue, WA (US); Alex G. Balazs, San Diego, CA (US); Henry Tayloe Stansbury, Saratoga, CA (US)

(73) Assignee: INTUIT INC., Mountain View, CA (US)

( * ) Notice: Subject to any disclaimer, the term of this patent is extended or adjusted under 35 U.S.C. 154(b) by 554 days.

(21) Appl. No.: 14/529,736

(22) Filed: Oct. 31, 2014

(51) Int. Cl.
*G06Q 40/00* (2012.01)

(52) U.S. Cl.
CPC .................. *G06Q 40/123* (2013.12)

(58) Field of Classification Search
CPC ............................ G06Q 40/123; G06Q 40/00
USPC .................................................. 705/35–45, 31
See application file for complete search history.

(56) References Cited

U.S. PATENT DOCUMENTS

| | | | |
|---|---|---|---|
| 4,213,251 A | 7/1980 | Foundos | |
| 4,809,219 A | 2/1989 | Ashford et al. | |
| 5,006,998 A | 4/1991 | Yasunobu | |
| 5,495,607 A | 2/1996 | Pisello et al. | |
| 5,557,761 A | 9/1996 | Chan et al. | |
| 5,673,369 A | 9/1997 | Kim | |
| 5,819,249 A | 10/1998 | Dohanich | |
| 6,078,898 A | 6/2000 | Davis | |
| 6,535,883 B1 | 3/2003 | Lee et al. | |

(Continued)

FOREIGN PATENT DOCUMENTS

| | | | |
|---|---|---|---|
| JP | 2002-117121 A | 4/2002 | |
| JP | 2005-190425 A | 7/2005 | |

(Continued)

OTHER PUBLICATIONS

Office Action dated Nov. 17, 2016 in U.S. Appl. No. 14/448,922, filed Jul. 31, 2014, inventor: Gang Wang.

(Continued)

*Primary Examiner* — Chia Yi Liu
*Assistant Examiner* — Jennifer Liu
(74) *Attorney, Agent, or Firm* — Vista IP Law Group LLP

(57) ABSTRACT

Systems, methods and articles of manufacture for determining impact chains from a calculation graph for calculating taxes. The system includes a computing device, a data store in communication with the computing device and a tax preparation software application executable by the computing device. The tax preparation software application has a tax calculation engine, a tax calculation graph, and an impact chain engine. The tax calculation engine is configured to perform a plurality of tax calculation operations based on a tax calculation graph. The impact chain engine is configured to analyze the tax calculation graph and determine an impact chain for each of a plurality of nodes in the graph, wherein an impact chain for a respective node consists of one of (a) each of the other nodes which are affected by the respective node, or (b) each of the other nodes which affect the respective node.

18 Claims, 17 Drawing Sheets

(56) References Cited

U.S. PATENT DOCUMENTS

| | | |
|---|---|---|
| 6,601,055 B1 | 7/2003 | Roberts |
| 6,631,361 B1 | 10/2003 | O'Flaherty et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 * | 3/2011 | Talan ............... G06Q 40/02 705/30 |
| 7,900,298 B1 | 3/2011 | Char et al. |
| 7,908,190 B2 | 3/2011 | Enenkiel |
| 7,912,768 B2 | 3/2011 | Abeles |
| 7,925,553 B2 | 4/2011 | Banks |
| 8,001,006 B1 | 8/2011 | Yu et al. |
| 8,082,144 B1 | 12/2011 | Brown et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B1 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 9,372,687 B1 | 6/2016 | Pai |
| 9,760,953 B1 | 9/2017 | Wang et al. |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0078271 A1 | 4/2004 | Marano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 * | 9/2004 | Barthel ............... G06Q 10/10 705/31 |
| 2004/0205008 A1 | 10/2004 | Haynie et al. |
| 2005/0171822 A1 | 8/2005 | Cagan |
| 2005/0216379 A1 | 9/2005 | Ozaki |
| 2006/0112114 A1 | 5/2006 | Yu |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0094207 A1 | 4/2007 | Yu |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2008/0059900 A1 | 3/2008 | Murray |
| 2008/0097878 A1 | 4/2008 | Abeles |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0048957 A1 | 2/2009 | Celano |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0131394 A1 | 5/2010 | Rutsch |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0225220 A1 | 9/2011 | Huang et al. |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 * | 5/2012 | Miller ............... G06Q 40/123 705/31 |
| 2012/0278365 A1 * | 11/2012 | Labat ............... G06Q 10/06 707/798 |
| 2013/0036347 A1 | 2/2013 | Eftekhari |
| 2013/0080302 A1 | 3/2013 | Allanson |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0198047 A1 | 8/2013 | Houseworth |
| 2013/0218735 A1 | 8/2013 | Murray |
| 2013/0262279 A1 | 10/2013 | Finley et al. |

(56) References Cited

U.S. PATENT DOCUMENTS

| | | |
|---|---|---|
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang |

FOREIGN PATENT DOCUMENTS

| | | |
|---|---|---|
| JP | 2014-206960 A | 10/2014 |
| KR | 10-2012-0011987 A | 2/2012 |

OTHER PUBLICATIONS

Amendment dated Feb. 17, 2016 in U.S. Appl. No. 14/448,922, filed Jul. 31, 2014, inventor: Gang Wang.

Office Action dated Apr. 6, 2017 in U.S. Appl. No. 14/448,922, filed Jul. 31, 2014, inventor: Gang Wang.

Office Action dated Aug. 11, 2016 in U.S. Appl. No. 14/448,962, filed Jul. 31, 2014, inventor: Gang Wang.

Amendment dated Nov. 11, 2016 in U.S. Appl. No. 14/448,962, filed Jul. 31, 2014, inventor: Gang Wang.

Office Action dated Jan. 13, 2017 in U.S. Appl. No. 14/448,962, filed Jul. 31, 2014, inventor Gang Wang.

Office Action dated Aug. 23, 2016 in U.S. Appl. No. 14/448,986, filed Jul. 31, 2014, inventor: Gang Wang.

Response dated Jan. 23, 2017 in U.S. Appl. No. 14/448,986, filed Jul. 31, 2014, inventor: Gang Wang.

Office Action dated Feb. 17, 2017 in U.S. Appl. No. 14/448,986, filed Jul. 31, 2014, inventor: Gang Wang.

Office Action dated Jan. 12, 2017 in U.S. Appl. No. 14/462,411, filed Aug. 18, 2014, inventor: Gang Wang.

Office Action dated Feb. 7, 2017 in U.S. Appl. No. 14/555,543, filed Nov. 26, 2014, inventor: Gang Wang.

PCT International Search Report for PCT/US2016/039919, Applicant: Intuit Inc., Form PCT/ISA/210 and 220, dated Oct. 11, 2016.

PCT Written Opinion of the International Search Authority for PCT/US2016/039919, Applicant: Intuit Inc., Form PCT/I5A/237, dated Oct. 11, 2016.

PCT International Search Report for PCT/US2016/039917, Applicant: Intuit Inc., Form PCT/ISA/210 and 220, dated Oct. 11, 2016.

PCT Written Opinion of the International Search Authority for PCT/US2016/039917, Applicant: Intuit Inc., dated Oct. 11, 2016.

PCT International Search Report for PCT/US2016/039918, Applicant: Intuit Inc., Form PCT/ISA/210 and 220, dated Oct. 11, 2016.

PCT Written Opinion of the International Search Authority for PCT/US2016/039918, Applicant: Intuit Inc., PCT/ISA/237, dated Oct. 11, 2016.

PCT International Search Report for PCT/US2016/039913, Applicant: Intuit Inc., Form PCT/ISA/210 and 220, dated Oct. 21, 2016.

PCT Written Opinion of the International Search Authority for PCT/US2016/039913, Applicant: Intuit Inc., PCT/ISA/237 dated Oct. 21, 2016.

PCT International Search Report for PCT/US2016/039916, Applicant: Intuit Inc., Form PCT/ISA/210 and 220, dated Oct. 11, 2016.

PCT Written Opinion of the International Search Authority for PCT/US2016/039916, Applicant: Intuit Inc., Form PCT/ISA/237, dated Oct. 11, 2016.

http://en.wikipedia.org/wiki/Dependency_grammar#Semantic_dependencies, printed Mar. 11, 2014.

http://www.webopedia.com/TERM/L/loose_coupling.html, printed Mar. 11, 2014.

http://en.wikipedia.org/wiki/Loose_coupling, printed Mar. 11, 2014.

www.turbotax.com, printed Mar. 11, 2014.

https://turbotax.intuit.com/snaptax/mobile/, printed Mar. 11, 2014.

http://www.jboss.org/drools/drools-expert.html, printed Mar. 11, 2014.

http://en.wikipedia.org/wiki/Drools, printed Mar. 11, 2014.

http://en.wikipedia.org/wiki/Declarative_programming, printed Mar. 11, 2014.

http://www.wisegeek.com/what-is-declarative-programming.htm, printed Mar. 11, 2014.

http://docs.jboss.org/drools/release/5.3.0.Final/drools-expert-docs/html/ch01.html, printed Mar. 11, 2014.

http://quicken.intuit.com/support/help/tax-savings/simplify-tax-time/INF24047.html, updated Jul. 25, 2013, printed Jun. 24, 2014 (11 pages).

http://quicken.intuit.com/support/help/income-and-expenses/how-to-assign-tax-form-line-items-to-a-category/GEN82142.html, updated Aug. 11, 2011, printed Jun. 24, 2014 (2 pages).

http://quicken.intuit.com/support/help/reports—graphs-and-snap-shots/track-the-earnings—taxes—deductions—or-deposits-from-paychecks/GEN82101.html, updated May 14, 2012, printed Jun. 24, 2014 (2 pages).

NY State Dep of Taxation, NY State Personal Income Tax MeF Guide for Software Developers, 2012, NY State.

Restriction Requirement dated May 22, 2015 in U.S. Appl. No. 14/097,057, filed Dec. 4, 2013, inventor: Gang Wang.

Response dated Jun. 30, 2015 in U.S. Appl. No. 14/097,057, filed Dec. 4, 2013, inventor: Gang Wang.

Office Action dated Oct. 2, 2015 in U.S. Appl. No. 14/097,057, filed Dec. 4, 2013, inventor: Gang Wang.

Response dated Feb. 29, 2016 in U.S. Appl. No. 14/097,057, filed Dec. 4, 2013, inventor: Gang Wang.

Final Office Action dated Apr. 8, 2016 in U.S. Appl. No. 14/097,057, filed Dec. 4, 2013, inventor: Gang Wang.

Pre-Appeal Brief dated Jun. 24, 2016 in U.S. Appl. No. 14/097,057, filed Dec. 4, 2013, inventor: Gang Wang.

Pre-Appeal Brief Conference Decision dated Aug. 15, 2016 in U.S. Appl. No. 14/097,057, filed Dec. 4, 2013, inventor: Gang Wang.

Amendment dated Sep. 13, 2016 in U.S. Appl. No. 14/097,057, filed Dec. 4, 2013, inventor: Gang Wang.

Office Action dated Nov. 4, 2016 in U.S. Appl. No. 14/097,057, filed Dec. 4, 2013, inventor: Gang Wang.

Amendment dated Feb. 6, 2017 in U.S. Appl. No. 14/097,057, filed Dec. 4, 2013, inventor: Gang Wang.

Final Rejection dated Mar. 9, 2017 in U.S. Appl. No. 14/097,057, filed Dec. 4, 2013, inventor: Gang Wang.

Office Action dated Dec. 23, 2016 in U.S. Appl. No. 14/462,345, filed Aug. 18, 2014, inventor: Gang Wang.

Amendment dated Mar. 23, 2017 in U.S. Appl. No. 14/462,345, filed Aug. 18, 2014, inventor: Gang Wang.

Office Action dated Mar. 10, 2017 in U.S. Appl. No. 14/448,678, filed Jul. 31, 2014, inventor Gang Wang.

Office Action dated Jul. 8, 2015 in U.S. Appl. No. 14/206,682, filed Mar. 12, 2015, inventor: Gang Wang.

Response dated Aug. 31, 2015 in U.S. Appl. No. 14/206,682, filed Mar. 12, 2015, inventor: Gang Wang.

Office Action dated Mar. 9, 2016 in U.S. Appl. No. 14/206,682, filed Mar. 12, 2015, inventor: Gang Wang.

(56) References Cited

OTHER PUBLICATIONS

Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Response dated Sep. 21, 2017 in U.S. Appl. No. 14/448,481, (44pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).

(56) References Cited

OTHER PUBLICATIONS

Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Vanderbilt University, "Free tax prep help available for Vanderbilt employees", Feb. 6, 2014, Vanderbilt University, pp. 1-3 [NPL-1].
Office Action dated Sep. 28, 2017 in U.S. Appl. No. 14/701,149, (71pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 25, 2017 in U.S. Appl. No. 14/700,981, (52pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Interview Summary dated Oct. 25, 2017 in U.S. Appl. No. 14/555,543, (3pgs.).
Office Action dated Oct. 20, 2017 in U.S. Appl. No. 14/555,296, (50pgs.).
Amendment and Response dated Oct. 27, 2017 in U.S. Appl. No. 14/675,166, (25pgs.).
Amendment and Response dated Sep. 21, 2017 in U.S. Appl. No. 14/448,481, (44pgs.).
Office Action dated Nov. 3, 2017 in U.S. Appl. No. 14/701,087, (103pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Amendment and Response dated Nov. 10, 2017 in U.S. Appl. No. 14/555,222, (25pgs.).
Amendment and Response dated Nov. 27, 2017 in U.S. Appl. No. 14/755,859, (53pgs.).
Office Action dated Oct. 11, 2017 in U.S. Appl. No. 14/701,030, (53pgs.).
Advisory Action dated Nov. 22, 2017 in U.S. Appl. No. 14/555,334, (2pgs.).
Amendment and Response dated Nov. 7, 2017 in U.S. Appl. No. 14/555,334, (26pgs.).
Office Action dated Nov. 28, 2017 in U.S. Appl. No. 14/448,886, (65pgs.).
OpenRules, Preparing a Tax Return Using OpenRules Dialog, Aug. 2011 (Year: 2011) (25pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
U.S. Appl. No. 14/555,296, dated Oct. 20, 2017 (1 page).

* cited by examiner

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | N | N | N | ? | Yes |
| Rule₅ | N | N | ? | N | ? | N | ? | Yes |

FIG. 4

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 5

SYSTEMS AND METHODS FOR DETERMINING IMPACT CHAINS FROM A TAX CALCULATION GRAPH OF A TAX PREPARATION SYSTEM

SUMMARY

Embodiments of the present invention are directed to computerized systems and methods for preparing an electronic tax return using a tax return preparation application; and more particularly, to systems and methods for determining and/or using impact chains and/or impact correlations determined from a tax calculation graph used by a tax calculation engine to perform tax calculation operations.

The embodiments of the present invention may be implemented on and/or within a tax return preparation system comprising a tax preparation software application executing on a computing device. The tax return preparation system may operate on a new construct in which tax rules and the calculations based thereon are established in declarative data-structures, namely, completeness graph(s) and tax calculation graph(s). The tax calculation graph(s) comprise a plurality of nodes including input nodes, functional nodes, and function nodes. The tax calculation graph(s) are also configured with a plurality of calculation paths wherein each calculation path connects a plurality of nodes which are data dependent such that a node is connected to another node if the node depends on the other node. Use of these data-structures permits the user interface to be loosely connected or even divorced from the tax calculation engine and the data used in the tax calculations. Tax calculations are dynamically calculated based on tax-related data that is input from a user, derived from sourced data, or estimated. A smart tax logic agent running on a set of rules can review current run time data and evaluate missing tax data necessary to prepare and complete a tax return. The tax logic agent proposes suggested questions to be asked to a user to fill in missing blanks. This process can be continued until completeness of all tax topics has occurred. A completed tax return (e.g., a printed tax return or an electronic tax return) can then be electronically prepared and filed (electronically and/or in paper form) with respect to the relevant taxing jurisdictions.

In another aspect of the tax return preparation system, the system is configured to operate the computing device to establish a connection to a data store configured to store user-specific tax data therein. The computing device executes a tax calculation engine configured to read and write tax calculation data to and from the shared data store, the tax calculation engine using one or more of the tax calculation graphs specific to particular tax topics. The computing device executes a tax logic agent, the tax logic agent reading from the shared data store and a plurality of decision tables collectively representing a completion graph for computing tax liability or a portion thereof, the tax logic agent outputting one or more suggestions for missing tax data based on an entry in one of the plurality of decision tables. The computing device executes a user interface manager configured to receive the one or more suggestions and present to a user one or more questions based on the one or more suggestions via a user interface, wherein a user response to the one or more questions is input to the shared data store. The user interface manager is configured to generate and display a question screen to the user. The question screen includes a question for the user requesting tax data and is also configured to receive the tax data from the user in the form of input from the user. The user interface manager which receives the suggestion(s) selects one or more suggested questions to be presented to a user. Alternatively, the user interface manager may ignore the suggestion(s) and present a different question or prompt to the user.

In the event that all tax topics are covered, the tax logic agent, instead of outputting one or more suggestions for missing tax data may output a "done" instruction to the user interface manager. The computing device may then prepare a tax return based on the data in the shared data store. The tax return may be a conventional paper-based return or, alternatively, the tax return may be an electronic tax return which can then be e-filed.

In one embodiment of the present invention, the tax preparation system further comprises an impact chain engine configured to analyze the tax calculation graphs and determine impact chains. An impact chain is a sequence of interdependent nodes within a tax calculation graph. Accordingly, an impact chain for a respective node of a calculation graph consists of one of (a) each of the other nodes which are affected by the respective node (e.g. a top-down traverse of the calculation graph commencing with the respective node), or (b) each of the other nodes which affect the respective node (e.g. a bottom-up traverse of the calculation graph commencing with the respective node).

In other embodiments of the present invention, the impact chains may be utilized for a number of useful purposes. For example, the impact chains may be used for determining impact correlations between nodes of a calculation graph, generating explanations for a tax calculation or tax operation performed by the tax preparation system, and individualizing the operation of the tax preparation system for a particular taxpayer.

In another embodiment of the present invention, the tax preparation system is further configured to use the impact chains to determine impact correlations between nodes of the calculation graph. An impact correlation defines a relationship between a first node and a second node, which defined relationship may be a qualitative impact correlation or a quantitative impact correlation. A qualitative impact correlation describes a qualitative change relationship between a first node and a second node, such as a change (e.g. an increase or decrease) in the first node causes a change (such as an increase or decrease) in the second node, but does not quantify the amount of change caused by the change in the first node. A quantitative correlation quantifies a change in the first node (e.g. an increase or decrease) that will result from a change in the second node (e.g. dollar for dollar increase or decrease). The system may have a separate impact correlation engine, or integrate this functionality into the impact chain engine, wherein both the separate and integrated configurations are referred to herein as the impact chain engine.

The tax preparation system may be further configured to use the impact correlations and/or impact chains for testing and identifying programming errors in the tax preparation software 100, identifying whether tax topics are irrelevant to each other, and individualizing the user experience in using the tax preparation system to prepare a tax return.

In still another embodiment of the present invention, the tax preparation system is configured to use the impact chains in generating and providing explanations for the results of tax calculations, tax results and/or tax operations using an explanation engine. A plurality of the nodes, such as tax operations, are associated with an explanation of a result of the respective node. The tax preparation system executes an explanation engine within the tax preparation software to generate a narrative explanation from one or more explanations associated with one of the tax operations and the computing device presents the narrative explanation to the user on a computing device. The system utilizes the impact chains to construct explanation trees based on the impact chains to determine each of the nodes which have an effect on the target tax operation for which an explanation is being generated. The explanation engine may then generate explanations from each of the tax operations within the impact chain in order to provide a user with more complete explanations for the result of the target tax operation based on each of the tax operations affecting the target tax operation.

Another embodiment of the present invention is directed to computer-implemented methods for determining and using impact chains using the tax preparation system as described above. For example, the method may include, the tax preparation system executing the tax preparation software application. The tax preparation software then executes the impact chain engine to analyze a tax calculation graph and determine a plurality of impact chains from the tax calculation graph.

Still another embodiment of the present invention is directed to computer-implemented methods for determining and using impact correlations using the tax preparation system as described above. The method may include, for example, the tax preparation system executing the tax preparation software application. The tax preparation software executes the impact chain engine to analyze a tax calculation graph and determine an impact correlation between a first node and a second node on the tax calculation graph utilizing an impact chain which includes both the first node and the second node.

Another embodiment of the present invention is directed to an article of manufacture comprising a non-transitory computer readable medium embodying instructions executable by a computer to execute a process according to any of the method embodiments of the present invention for determining and/or utilizing impact chains and/or impact correlations. For instance, the non-transitory computer readable medium embodying instructions executable by a computer may be configured to execute a process comprising: the tax preparation system executing the tax preparation software application; and the tax preparation software executing the impact chain engine to analyze a tax calculation graph and determine a plurality of impact chains from the tax calculation graph. As another example, the non-transitory computer readable medium embodying instructions executable by a computer may be configured to execute a process comprising: the tax preparation system executing the tax preparation software application; and the tax preparation software executing the impact chain engine to analyze a tax calculation graph and determine an impact correlation between a first node and a second node on the tax calculation graph utilizing an impact chain which includes both the first node and the second node.

In additional aspects, the article of manufacture may be further configured according to the additional aspects described herein for the methods for determining and/or utilizing impact chains and/or impact correlations.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

FIG. 4 illustrates a decision table based on or derived from the completeness graph of FIG. 3.

FIG. 5 illustrates another embodiment of a decision table that incorporates statistical data.

DETAILED DESCRIPTION OF ILLUSTRATED EMBODIMENTS

Figure 1:
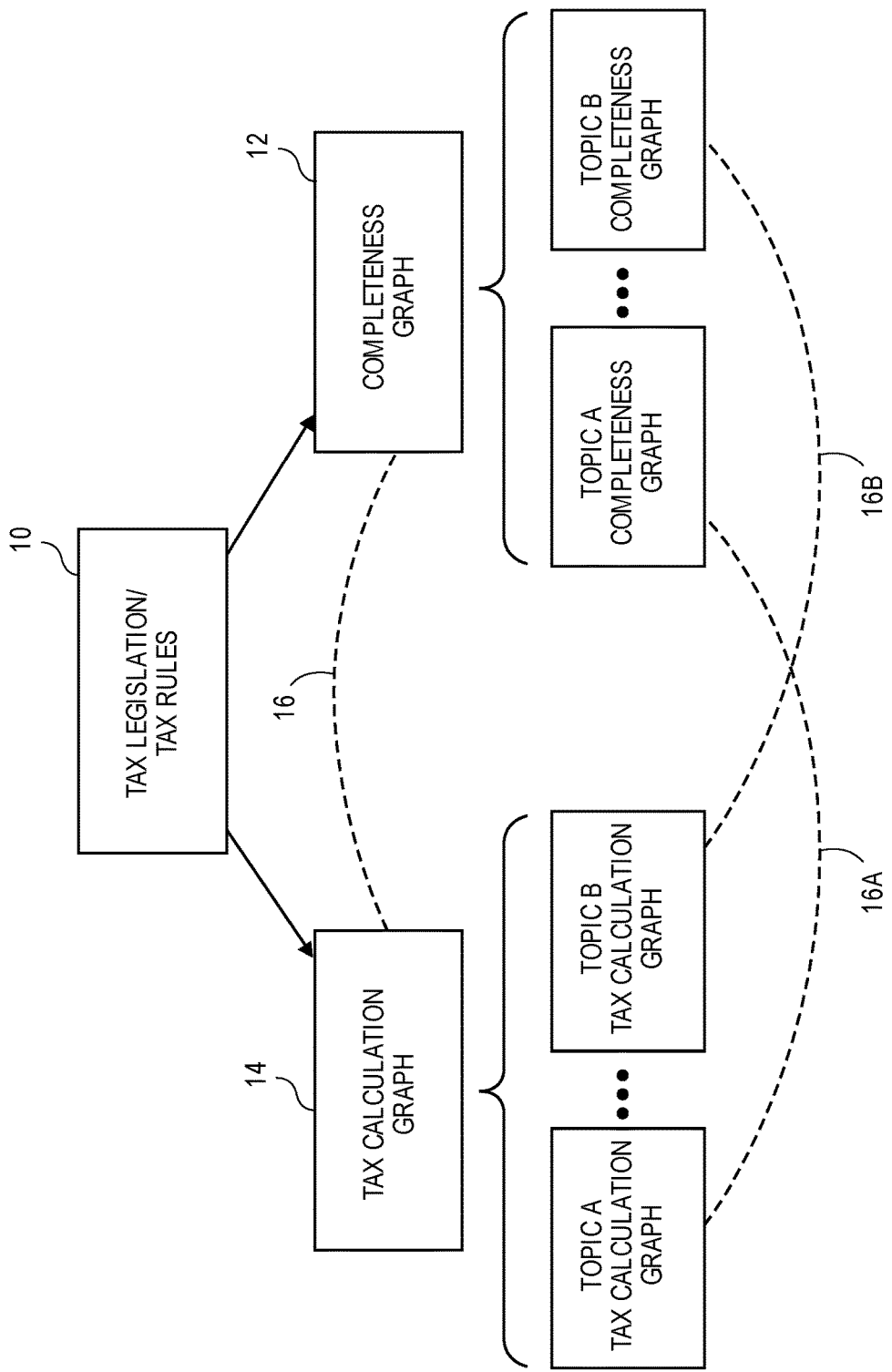
FIG. 1 schematically illustrates how tax legislation/tax rules are parsed and represented by a completeness graph and a tax calculation graph.

Embodiments of the present invention are directed to systems, methods and articles of manufacture for determining and utilizing impact chains within a tax calculation graph of a tax preparation system. An impact chain is a sequence of interdependent nodes within the tax calculation graph having a cause and effect relationship. In other words, an impact chain for a particular node consists of one of (a) each of the other nodes which are affected by the particular node, or (b) each of the other nodes which affect the particular node. A first node "is affected" by another node if the first node is dependent on the other node, such as the value, result or outcome of the first node depends on the value, result or outcome of the other node. Similarly, a first node "affects" another node if the other node is dependent on the first node, such as the value, result or outcome of the other node depends on the value, result or outcome of the first node. The nodes of the tax calculation graph comprise a plurality of input nodes, functional nodes, function nodes, and tax operations (which are defined by a functional node and an associated function). An impact chain engine of the tax preparation system is configured to analyze the tax calculation graph and determine one or more impact chains, wherein each impact chain includes each of the nodes in the tax calculation graph which are interdependent on each other. The impact chains may then be used in a variety of ways, such as for generating explanations for a tax calculation, determining impact correlations between nodes of the calculation graph, individualizing the operation of the tax preparation application for a particular taxpayer, etc.

Tax preparation is a time-consuming and laborious process. It is estimated that individuals and businesses spend around 6.1 billion hours per year complying with the filing requirements of the United States federal Internal Revenue Code. Tax return preparation software has been commercially available to assist taxpayers in preparing their tax returns. Tax return preparation software is typically run on a computing device such as a computer, laptop, tablet, or mobile computing device such as a Smartphone. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, the present design provides tax preparation software 100 that runs on computing devices 102, 103 (see FIG. 13) and operates on a new construct in which tax rules and the calculations based thereon are established in declarative data-structures, namely, completeness graph(s) and tax calculation graph(s). Completeness graphs 12 (see e.g. FIGS. 1-3) and tax calculation graphs 14 (see e.g. FIGS. 6A-6D) are data structures in the form of trees having nodes and interconnections between the nodes indicating interdependencies. Completeness graphs 12 identify each of the conditions (e.g. questions, criteria, conditions) which may be required to be satisfied to complete a particular tax topic or a complete tax return, and also identifies when all conditions have been satisfied to complete a particular tax topic or, a complete, file-able tax return. The tax calculation graphs 14 semantically describe data dependent nodes, including input nodes, functional nodes, functions, and tax operations, that perform tax calculations or operations in accordance with tax code or tax rules. Examples of these data structures are described in U.S. patent application Ser. Nos. 14/097,057 and 14/448,886, both of which are incorporated by reference as if set forth fully herein.

Use of these data-structures permits the user interface to be loosely connected or even detached from the tax calculation engine and the data used in the tax calculations. Tax calculations are dynamically calculated based on tax data derived from sourced data, estimates, user input, or even intermediate tax calculations that are then utilized for additional tax calculations. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Figure 2:
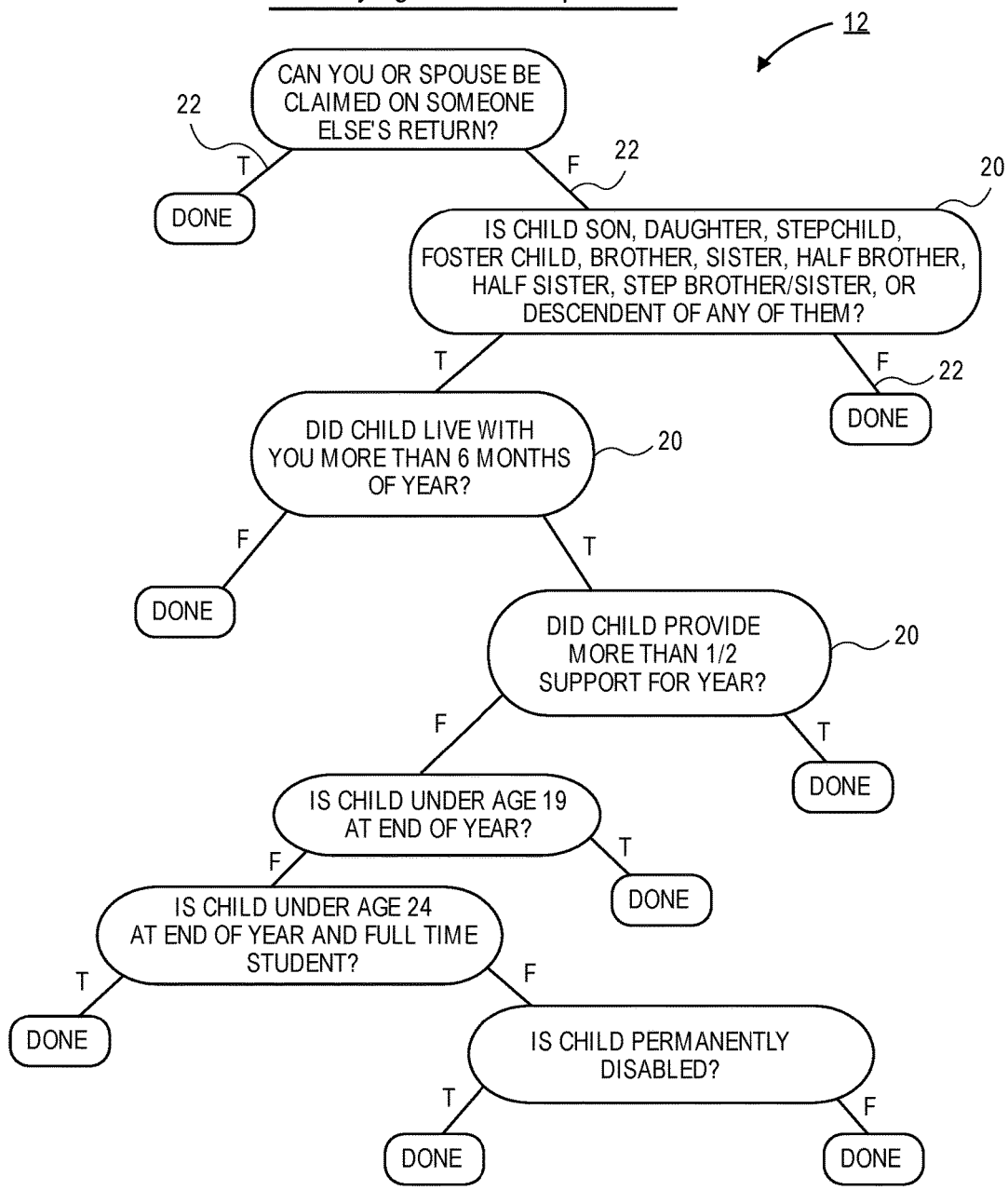
FIG. 2 illustrates an example of a simplified version of a completeness graph related to a qualifying child for purposes of determining deductions for federal income tax purposes.

The completeness graph 12 and the tax calculation graph 14 represent data structures that can be constructed in the form of a tree. FIG. 2 illustrates a completeness graph 12 in the form of a tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 3:
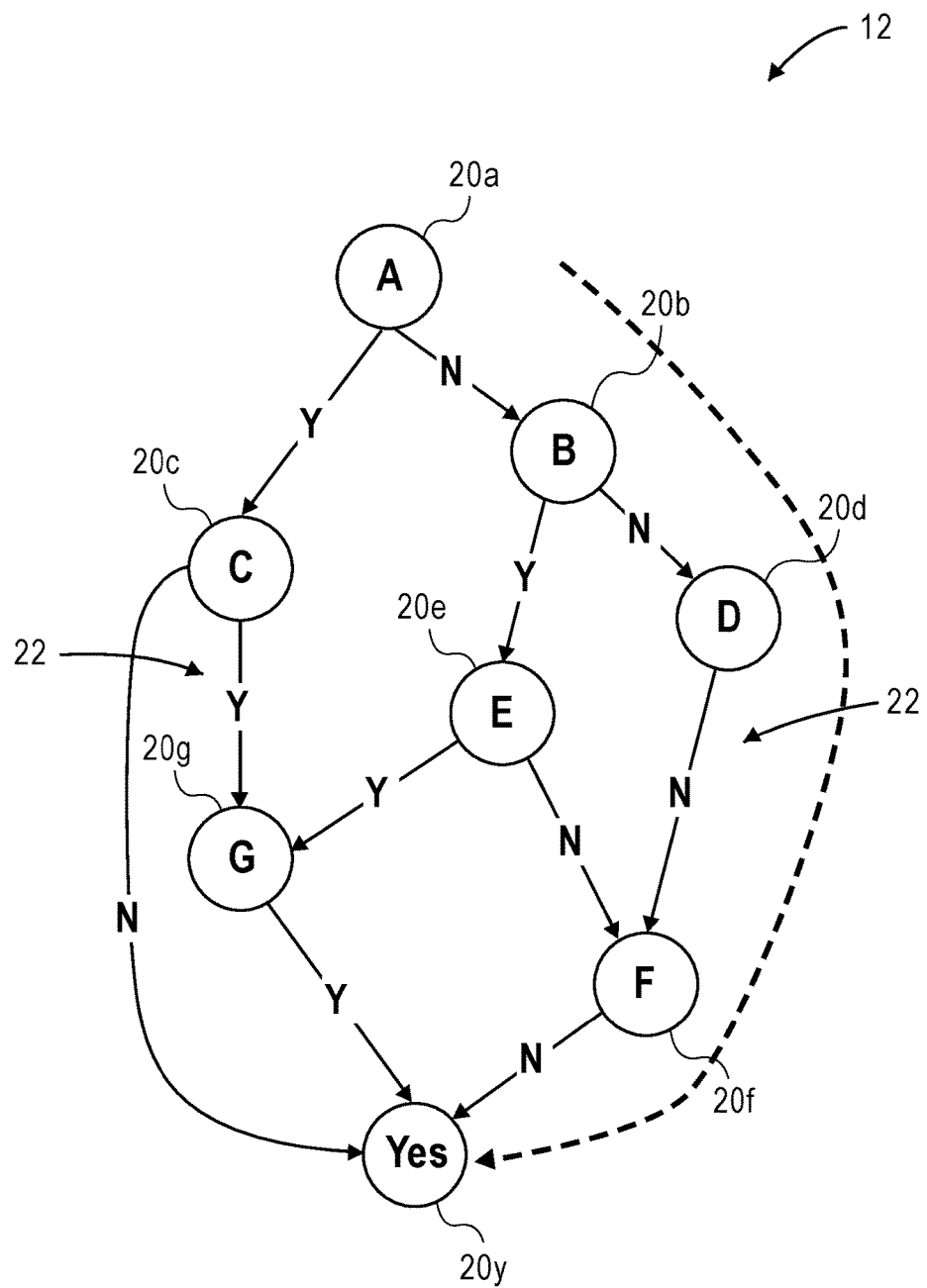
FIG. 3 illustrates another illustration of a completeness graph.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner, the system can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_c$ and $Q_G$ in columns 34c, 34g, respectively. One of these questions is selected and the process repeats until either the goal 34h is reached or there is an empty candidate list.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 6A:
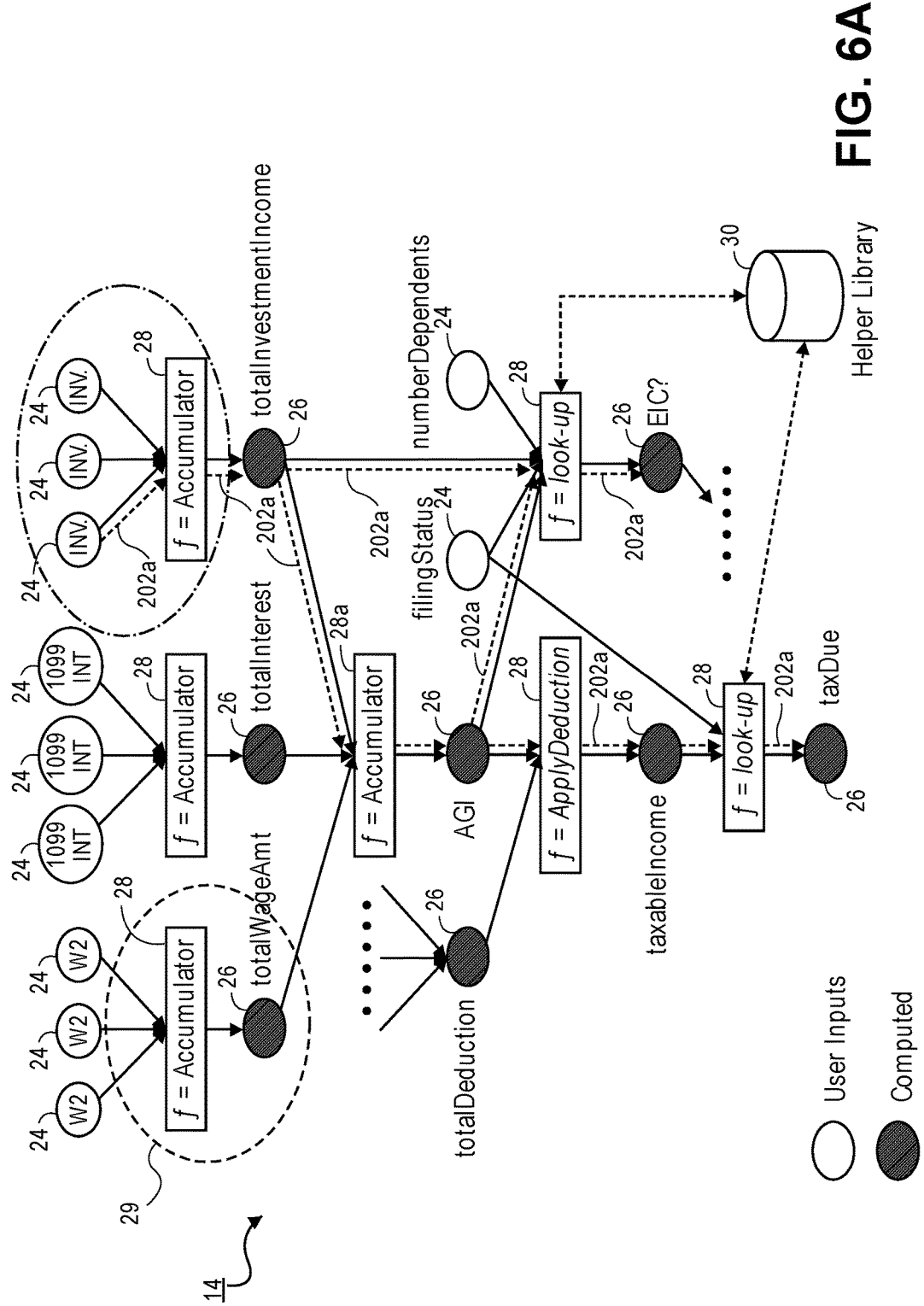
FIG. 6A illustrates an example of a calculation graph and impact chain according to one embodiment.

FIG. 6A illustrates an example of a tax calculation graph 14. The tax calculation graph 14 semantically describes data dependent tax operations that are used to perform a tax calculation in accordance with the tax code or tax rules 10. The tax calculation graph 14 in FIG. 6A is a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax preparation software 100 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 6A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between functional nodes 26 can be called upon by the tax preparation software 100 for performing tax calculations. Utilizing these common functions 28 greatly improves the efficiency of the tax preparation software 100 and can be used by a programmer to more easily track and follow the complex nature of the ever-evolving tax code. The common functions 28 also enable easier updating of the tax preparation software 100 because as tax laws and regulations change, fewer changes need to be made to the software code as compared to prior hard-wired approaches.

Importantly, the tax calculation graph 14 and the associated functional node 26 and functions 28 can be tagged and later be used or called upon to intelligently explain to the user the reasoning behind why a particular result was calculated or determined by the tax preparation software 100 program, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function node 28 may include any number of mathematical or other operations. Examples of functions 28 include summation, subtraction, multiplication, division, and look-ups of tables or values from a database 30 or library as is illustrated in FIG. 6A. It should be understood that the functional node 26 within completion graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completion graph 12 and the tax calculation graph 14.

Figure 6B:
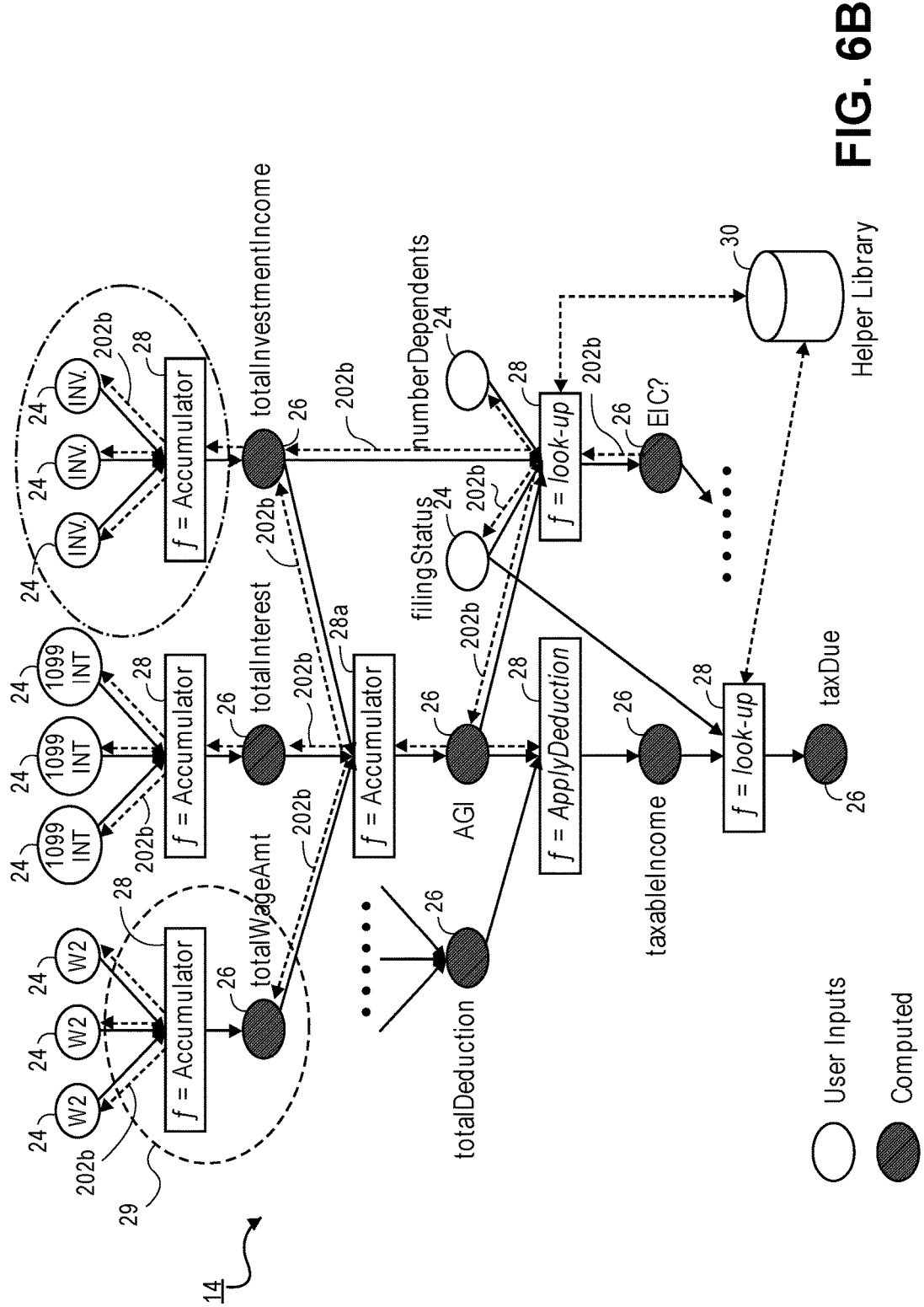
FIG. 6B illustrates an example of a calculation graph and impact chain according to one embodiment.

FIG. 6B is the same tax calculation graph as FIG. 6A, except it shows a different impact chain 202, as described in detail below.

Figure 6C:
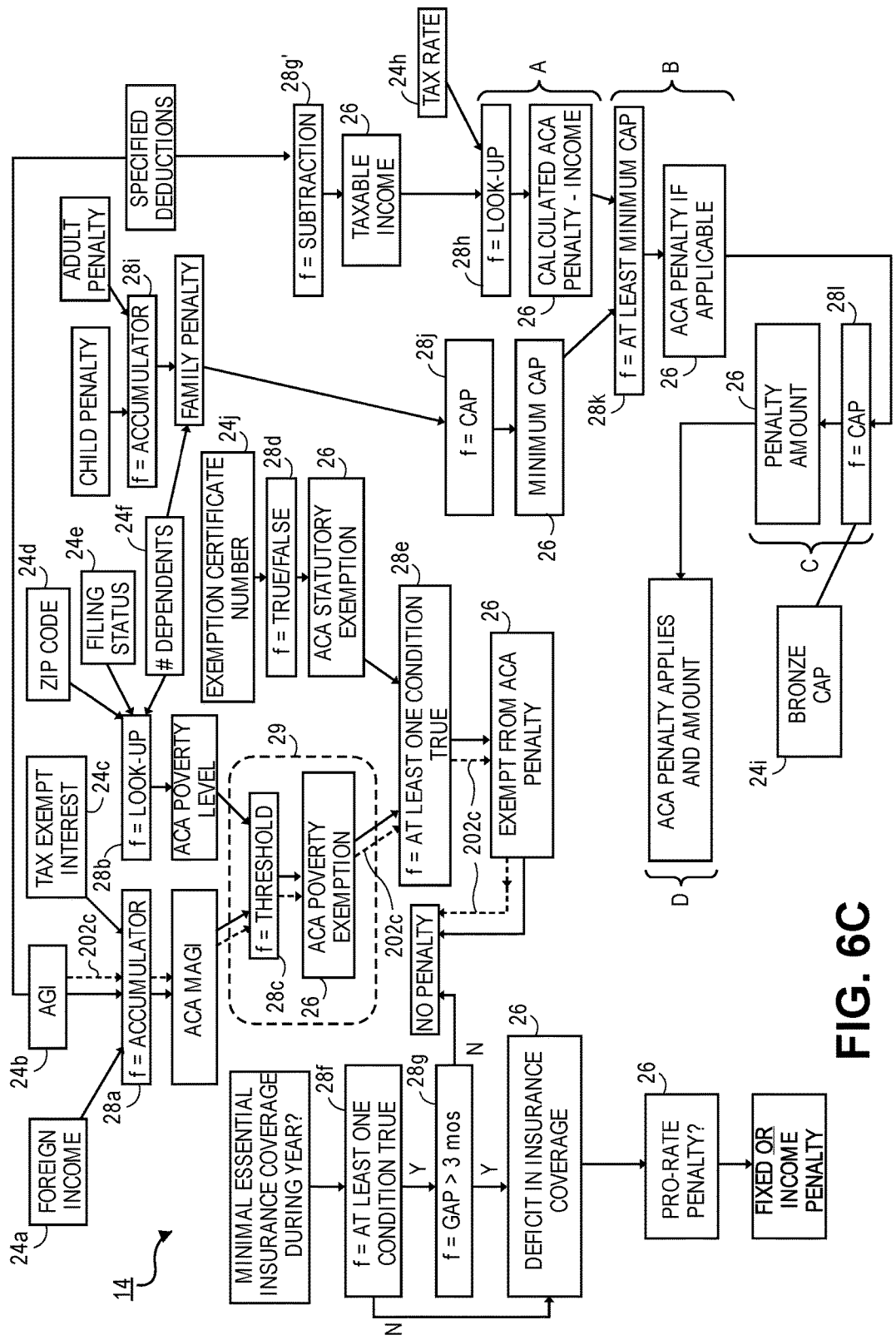
FIG. 6C illustrates an example of a calculation graph and impact chain that relates to the determination and calculation of a shared responsibility penalty under the Affordable Care Act, according to one embodiment.

FIG. 6C illustrates a detailed example of a tax calculation graph 14 that is used to calculate the amount of penalty under the Affordable Care Act (ACA). Under the ACA, taxpayers are required to have minimum essential health coverage for each month of the year, qualify for an exemption, or make a shared responsibility penalty payment when filing his or her federal tax return. FIG. 6C illustrates a flowchart illustration of a process used to calculate a taxpayer's shared responsibility payment under the ACA (referred to herein as an ACA penalty). FIG. 6C illustrates, for example, various leaf nodes 24a-24j used as part of this calculation to determine the ACA penalty. Leaf nodes 24a-24f are used to calculate the modified adjusted gross income (ACA MAGI) as well as the applicable ACA poverty level. One can see how the accumulator function 28a is used to generate the ACA MAGI in this example by adding foreign income 14a, AGI 24b, and tax exempt interest 24c. Likewise, a look-up function 28b can be used to determine the applicable ACA poverty level based on the taxpayer's zip code 24d, filing status 24e, and number of dependents 24f. The ACA MAGI and the ACA poverty level are then subject to a thresholding function 28c to determine whether the ACA poverty level exemption applies. Under the ACA, if a taxpayer cannot afford basic coverage because the minimum amount one must pay for the premiums exceeds a percentage of household income (i.e., 8%), one is exempt from obtaining minimum essential coverage.

Still referring to FIG. 6C, a taxpayer may be exempt from the requirement to obtain minimum essential coverage by obtaining a different statutory exemption. These exemptions include: religious conscience, health care sharing ministry, a member of Indian tribe, short coverage gap (less than 3 consecutive months), hardship, affordability (already mentioned above), incarceration, and not lawfully present. A true/false Boolean function 28d may be used to determine whether an Exemption Certificate Number (ECN) has been obtained from the taxpayer certifying that one of the statutory exemptions has been satisfied. Another threshold function 28e is applied to determine whether one of the statutory exemptions is satisfied (e.g., affordability or others). If at least one of these statutory conditions is met then the taxpayer is exempt from the ACA shared responsibility payment penalty.

As seen in FIG. 6C, if a taxpayer has obtained minimal essential coverage during the year, there is still the possibility that a penalty may be owed because under the ACA, if there is a gap in coverage for a covered member of the family of more than three (3) months, at least some penalty amount is owed. Function 28f (at least one condition true) is used to determine if there was minimum essential coverage during the year for any period. Function 28g (gap>3 months) is used to determine the gap in coverage in order to gaps in coverage that exceed the 3 month statutory requirement. The gap in coverage penalty, however, may be pro-rated based on the length of the gap in coverage as indicated in FIG. 6C.

In the event there is a penalty, the ACA requires that the penalty be the greater of a percentage of income, net of specified deductions, or a specified penalty that is applied per individual or family. For example, for the 2015 year, the percentage is 2.0 percent and increases to 2.5 percent in subsequent years. FIG. 6B illustrates the use of a subtraction function 28g that utilizes the AGI node 24b to arrive at a taxable income value. A look-up function 28h is used to obtain the applicable tax rate (e.g., 2.0% for 2015) and is used to calculate the income-based ACA penalty.

In order to determine the non-income or "fixed" penalty, an accumulator function 28i is used to determine the penalty. In this example, the calculation pertains to a family wherein the penalty includes a fixed amount for a child ($162.50 per child in 2015) and a fixed amount per adult ($325.00 per adult). Under the ACA, there is a maximum cap of this fixed penalty. For example, in 2015, the maximum family penalty is $975. As seen in FIG. 6C, a cap function 28j is used to determine the minimum cap. Another function 28k that is referred to as "at least minimum cap" is used to determine the greater of the fixed penalty or the income-based penalty. If the income-based penalty is higher than the fixed amount then that value is used, otherwise the fixed penalty amount is used. Still referring to FIG. 6C, another cap function 28l is used to determine whether the penalty has exceeded another cap that is part of the ACA law. Under the ACA, the overall penalty is capped at the national average premium for a bronze level insurance plan. The cap function 28l is used to ensure that the calculated penalty (i.e., the income based penalty) does not exceed this amount. After application of the cap function 28l, the ACA penalty amount is determined.

As seen in FIG. 6C, there are a variety of different functions 28 that are employed as part of the process used to calculate any applicable penalty under the ACA. In some instances, a common function (e.g., cap functions 28j and 28l) is found in multiple locations within the tax calculation graph 14. It should be understood that the functions 28 illustrated in FIG. 6C are illustrative as other functions may be used beyond those specifically illustrated in the drawings.

Figure 6D:
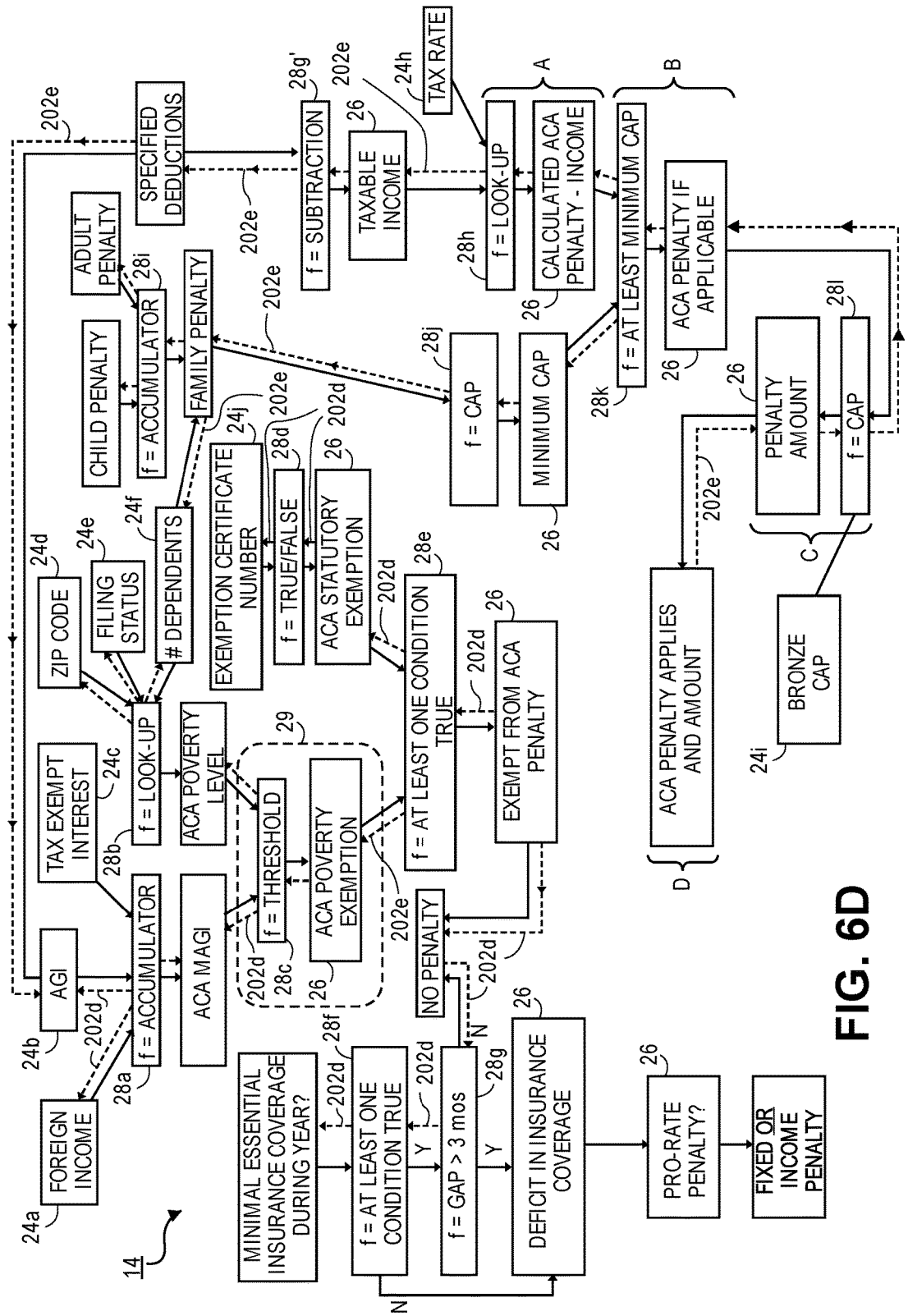
FIG. 6D illustrates an example of a calculation graph and impact chains that relates to the determination and calculation of a shared responsibility penalty under the Affordable Care Act, according to one embodiment.

FIG. 6D is the same tax calculation graph as FIG. 6C, except it shows two different impact chains 202, as described in detail below.

Figure 7:
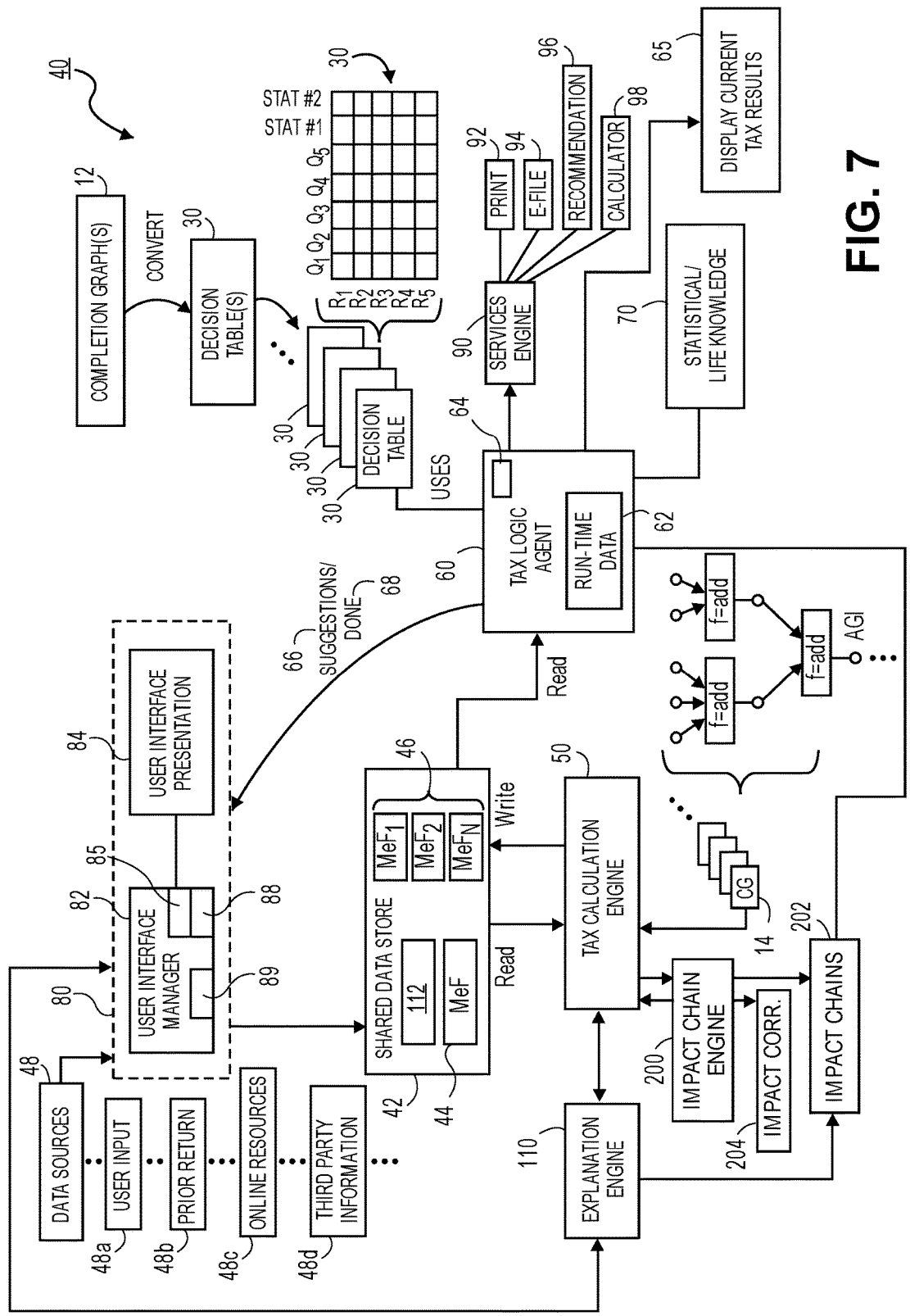
FIG. 7 schematically illustrates a system for calculating taxes using rules and calculations based on declarative data structures, and determining impact chains and impact correlations, according to one embodiment.

FIG. 7 schematically illustrates a tax return preparation system 40 for calculating taxes using rules and calculations based on declarative data structures according to one embodiment. The system 40 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 13). The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein the invention is not so limited. There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 7 illustrates several instances 46 of the MeF schema 44 (labeled as MeF$_1$, MeF$_2$, MeF$_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48*a* is one type of data source 48. User input 48*a* may take a number of different forms. For example, user input 48*a* may be generated by a user using, for example, an input device such as keyboard, mouse, touchscreen display, voice input (e.g., voice to text feature). photograph or image, or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48*b* to be searched but not online resources 48*c*. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48*a* may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48*b*. A prior year tax return 48*b* that is stored electronically can be searched and data is copied and transferred to the shared data store 42. The prior year tax return 48*b* may be in a proprietary format (e.g., .txf, .pdf) or an open source format. The prior year tax return 48*b* may also be in a paper or hardcopy format that can be scanned or imaged whereby data is extracted and transferred to the shared data store 42. In another embodiment, a prior year tax return 48*b* may be obtained by accessing a government database (e.g., IRS records).

An additional example of a data source 48 is an online resource 48*c*. An online resource 48*c* may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48*c* beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?". Additional follow-up questions can then be presented to the user.

Still referring to FIG. 7, another data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48d include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

Figure 13:
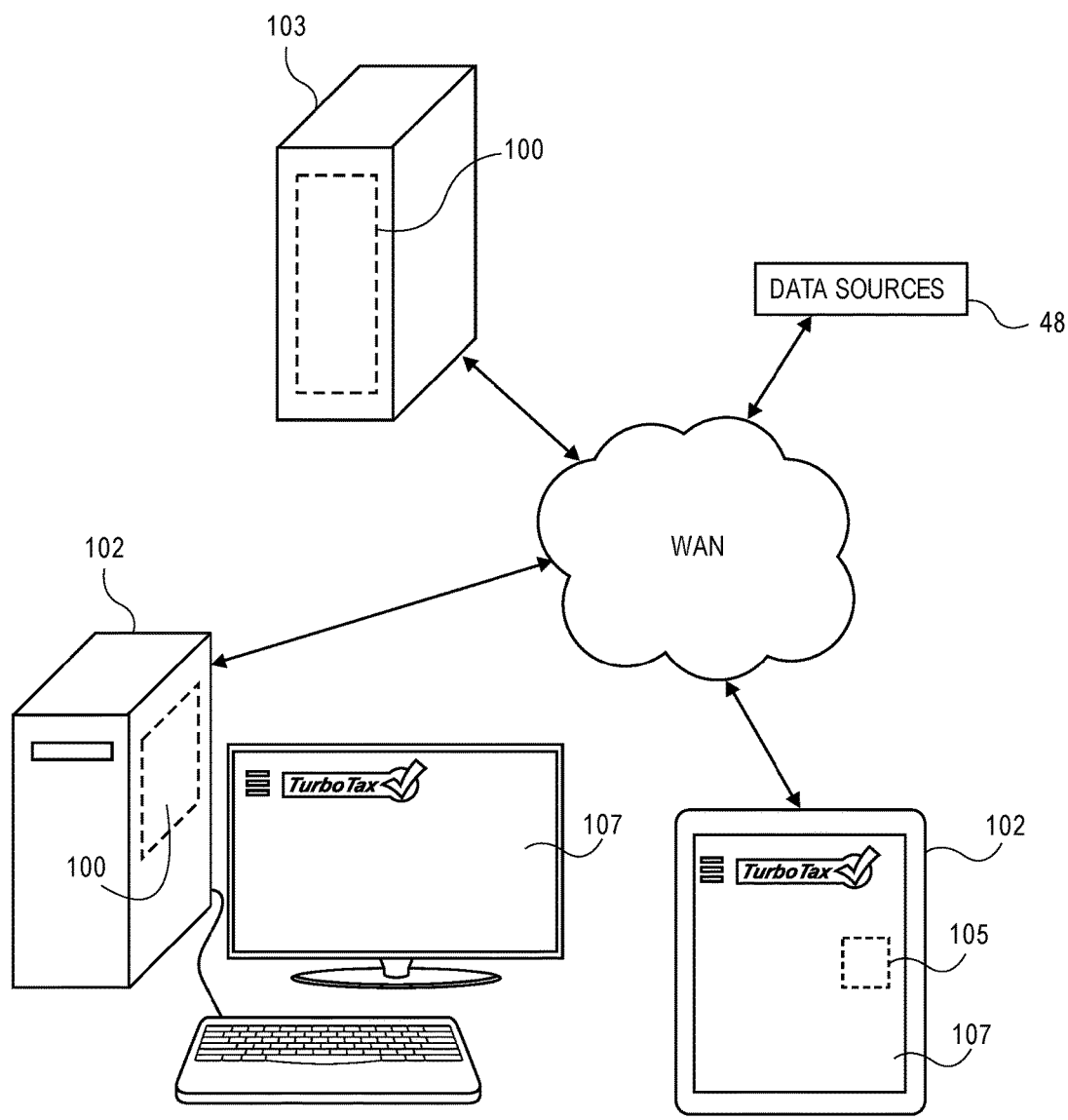
FIG. 13 illustrates the implementation of tax preparation software on various computing devices.

Referring briefly to FIG. 13, the tax preparation software 100 including the system 40 of FIG. 7 is executed by the computing device 102, 103. Referring back to FIG. 7, the tax return preparation software 100 executed by the computing device 102, 103 includes a tax calculation engine 50 that computes one or more tax calculations based on the tax calculation graph(s) 14 and the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A and 6B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax preparation software 100.

As seen in FIG. 7, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, in which case, as explained in more detail below, the UI control 80 presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing or compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097, 057 previously incorporated herein by reference, data such as required inputs can be stored to a fact cache so that the needed inputs can be recalled at a later time, and to determine what is already known about variables, factors or requirements of various rules:

Rule engine (64)/Tax Logic Agent (TLA) (60)
  // initialization process
  Load_Tax_Knowledge_Base;
  Create_Fact_Cache; While (new_data_from_application)
  Insert_data_into_fact_cache;
  collection=Execute_Tax_Rules; // collection is all the
    fired rules and corresponding conditions
  suggestions=Generate_suggestions (collection);
  send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(b) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102 (seen, for example, in FIG. 13). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 102, 103. This information may be displayed contemporaneously with other information, such as user input information, or user interview questions or prompts or even narrative explanations 116 as explained herein.

The TLA 60 also outputs a tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

As shown in FIG. 7, the tax preparation system 40 includes an impact chain engine 200. The impact chain engine 200 may operate within the tax preparation software 100, or it may be a separate software application operating independent of the tax preparation software 100, or it may be a separate software program operatively coupled with the tax preparation software 100. The impact chain engine 200 is configured to analyze the one or more calculation graphs 14 and determine from the tax calculation graph(s) 14 one or more impact chains 202 (see FIGS. 6A-6D). A particular impact chain 202 includes each of the nodes which are either affected by the value of another node in the chain or affects the value of another node in the chain. As explained above, a node includes a tax operation, an input node, a functional node and function nodes. The value of a node may be a numerical value, a logic value, a result of a function, a result of an operation at the node, or other value or result of the node. As described below, the impact chains 202 can be used for a variety of purposes, including generating explanations for results in tax calculations, determining impact correlations between nodes of a calculation graph (e.g. if the value of one node increases, what is the impact on another node), and tailoring the user experience with the tax preparation system 40 to the particular taxpayer.

Turning to FIGS. 6A and 6B, two examples of impact chains 202 are shown. For instance, in FIG. 6A, the impact chain 202a (shown by the dashed line with arrows) shows the interdependence of each of the nodes connected by the dashed line. The impact chain 202a can be topologically developed from a starting node and traversing downward (in the order of the calculation graph 14) to show each of the nodes affected by the starting node. In other words, the first input node 24 (labeled "INV") affects the function 28 and the functional node 26 (labeled "totalInvestmentIncome"), which in turn affects the function 28 (labeled "f=look-up"), which in turn affects the functional node 26 (labeled "EIC"). Accordingly, the impact chain 202a indicates that the investment income node 24 affects each of the nodes below it on the impact chain 202a.

An impact chain may also be topologically developed from the "bottom up" to determine each of the nodes which affect the starting node (the bottom node). Turning to FIG. 6B, for instance, impact chain 202b may begin at the bottom functional node 26 (labeled "EIC"), and then traverses upward to each of the nodes which affect this node. In this case, the impact chain 202b includes each of the nodes connected by the impact chain 202b as shown in FIG. 6B. The impact chain 202b also splits into multiple lines at several points along the impact chain 202b, including at the function node 28 (labeled "f=lookup"), and again at each of the function nodes 28 (labeled "f=Accumulator"). As can be seen, the impact chain 202b includes some additional nodes which are not a part of the impact chain 202a. This is because the additional nodes on impact chain 202b are not affected by the target node (the starting node, the input node 24 ("INV")) of impact chain 202a, but they do affect the target node (the starting node, functional node 26 ("EIC")). For example, the input node 24 (labeled "filingStatus") and the input node 24 (labeled "numberDependents") are not affected by the starting node (input node 24 labeled "INV") of impact chain 202a, but such nodes do affect the functional node 26 ("EIC") of impact chain 202b.

It should be understood that it is also possible to start or end an impact chain 202 at an intermediate node, and an impact chain 202 does not have to start or end at a beginning or terminal node of the calculation graph 14.

Turning to FIGS. 6C and 6D, impact chains 202 for a more specific example regarding the calculation graph 14 for the ACA penalty will be described. Referring first to FIG. 6C, an exemplary "top-down" impact chain 202c starts at input node 24b ("AGI") and traverses downward through tax operation node 28a, functional node 28c, threshold function node 28c, functional node 26b ("ACA Poverty Exemption"), function node 28e, ending at functional node 26 ("Exempt from ACA Penalty"). Accordingly, it can be seen that the taxpayer's AGI 24b affects each of the nodes along the impact chain 202c, including the end node 26a, which is a determination whether the taxpayer is exempt from the ACA Penalty.

Referring next to FIG. 6D, a "bottom-up" impact chain 202d starts at functional node 26a and traverses upward through each of the nodes which can affect the determination of the "Exempt from the ACA Penalty" functional node 26. The impact chain 202d splits into two lines at function node 28e, to include both lines which have affect functional node 26a. The first line includes the functional node 26b ("ACA Poverty Exemption") and the second line includes the functional node 26c ("ACA Statutory Exemption"). The two separate lines then traverse upwards along the impact chain 202d to the starting nodes of the respective lines. The line traversing upwards from the functional node 26b ("ACA Poverty Exemption") splits into two lines again, as shown in FIG. 6D. The impact chain 202d also includes the nodes along another line extending from functional node 26a which traverses through the nodes along a path to the function node 28f (which is a determination of "Minimal Essential Insurance Coverage During Year"). Accordingly, each of the nodes which affects the functional node 26b is included in the impact chain 202d.

Another "bottom-up" impact chain 202e is also shown in FIG. 6D. The impact chain 202e commences at the node D entitled "ACA Penalty Applies" and traverses upward along through each of the nodes which affect node D, including The impact chain engine 200 analyzes the calculation graphs 14 to determine the impact chains 202. For example, the impact chain engine 200 may be configured with an analysis algorithm to iteratively traverse the paths within a calculation graph 14 and determine impact chains 202. The algorithm may be tailored to determine all possible impact chains, or a certain number of impact chains, or impact chains having a minimum number of nodes, or other criteria. Thus, the impact chain engine 200 may commence at a first node and then traverse and/or propagate to each first degree interdependent node, and then to each of the second degree interdependent nodes which are interdependent upon the first degree interdependent nodes, and so on. As described above, this may be done top-down, or bottom-up, within a calculation graph 14. In addition, the impact chain engine 200 may be configured to determine the impact chains at a design time during the development of the tax preparation software application. In this case, the impact chains 202 can be utilized for identifying software errors and correcting the errors ("debugging" the software). For instance, a particular impact chain 202 can be populated with sample values and then run to see if the correct result is obtained. The impact chain engine 200 may also be configured to determine the impact chains at a run-time during the operation of the tax preparation software application to prepare tax returns, or even both at design time and at run-time.

The tax preparation software 100, and its software components, may be configured to utilize the impact chains 202 determined by the impact chain engine 200 in a number of useful ways. In one way, the tax preparation software 100 may be configured to utilize the impact chains 202 to determine a relevancy of one or more of tax topics and/or tax questions for a particular taxpayer. For instance, if an impact chain 202 indicates that a first tax topic and/or tax question is interdependent on a second tax topic and/or tax questions within the impact chain 202, then the tax preparation software 100 may be configured to determine that if the first tax question is relevant to the particular taxpayer, then the second tax topic and/or tax question is also likely to be relevant to particular taxpayer.

As an example, turning to FIG. 6D, the impact chain 202 indicates that both the Zip Code 24d, Filing Status 24e and # of Dependents 24f are all within the impact chain 202d for determining the taxpayer's status as Exempt From ACA Penalty. Thus, the tax preparation software 100 is configured to determine that Zip Code 24d, Filing Status 24e and # of Dependents 24f are all highly relevant to the particular taxpayer in determining the status as Exempt From ACA Penalty. The TLA 60 and user interface manager 82 of the tax preparation software 100 may be configured to utilize this relevancy data in determining which tax topics and tax questions to present to a user, and to tailor the user experience, as described herein.

The tax preparation software 100 may also be configured to utilize the impact chains 202 to individualize (e.g. personalize) the operation of the tax preparation software for a particular taxpayer. Similar to determining relevancy of tax topics and/or tax questions using the impact chains 202, the software 100 may also be configured to utilize the relevancy determined by the tax preparation software 100 using the impact chains 200 to individualize the user experience in preparing a tax return. The software 100 is configured to determine a relevancy score for a tax topic or tax question based on an impact chain 202. The relevancy score is then utilized by the TLA 60 to determine one or more suggested tax matters and/or tax questions for obtaining missing tax data required for completing the tax return for the particular taxpayer. The system 40 is configured to execute the user interface manager 82 to receive the suggested tax matters and/or tax questions from the TLA 60 and determine one or more tax questions to present to the user, as described above.

The tax preparation software 100 may also be configured to utilize the impact chains 202 to determine impact correlations 204 (see FIG. 7) between two or more nodes of an impact chain. An impact correlation 204 may be qualitative and/or quantitative. For example, a qualitative impact correlation may identify a qualitative change relationship between a first node and a second node, such as a change (e.g. an increase or decrease) in the first node causes a change (such as an increase or decrease) in the second node, but may not quantify the amount of change. As another example, a qualitative impact correlation may identify how a change in a first node (such as a change in a selection or input that does not have a relevant magnitude value, e.g. marital status, zip code, etc.) changes a second node (which may be a magnitude change in a value, or a change in a value not having a magnitude, such as a change in qualification for a deduction or credit).

The system 40 may use an impact correlation engine (not shown) to determine the impact correlations. The impact correlation engine may be integrated within the impact chain engine 200, or a separate impact correlation engine (not shown) operatively coupled to the impact chain engine 200, and both the integrated and separate configurations are referred to herein as the impact chain engine 200. In other words, the combination of a separate impact chain engine 200 and separate impact correlation engine is referred to as an impact chain engine 200.

In addition, the impact correlation 204 between a first node and second node may also involve one or more intermediary nodes, which are identified by the impact chain 202 connecting the first node and the second node. In this case, the impact chain engine 200 analyzes the correlations along the impact chain 202 between the two nodes to determine the impact correlation. For example, the impact chain engine 200 may multiply the positive and negative signs of the functional nodes 26, functions 28 and input nodes 24 along the impact chain 202. If the final result is "positive" then the first node and the second node have a positive correlation (i.e. an increase in the first node will likely cause an increase in the second node, and vice versa), and if the final result is "negative" then the first node and the second node have a negative correlation (i.e. an increase in the first node will likely cause a decrease in the second node, and vice versa).

A quantitative impact correlation identifies a quantitative correlation between a first node and a second node. For example, a quantitative correlation may indicate that a change in the first node (e.g. an increase or decrease) will result in a same magnitude change in the second node (e.g. dollar for dollar increase or decrease). The quantitative correlation between the first node and second node may be a proportional correlation, a factor correlation, a correlation based on a tax table, or other correlation, as dictated by the tax impact chain 202 which is determined based on a calculation graph 14. As with the qualitative impact correlation, the quantitative impact correlation may also involve one or more intermediary nodes between the first node and the second node, as identified by the impact chain 202 connecting the first node and the second node.

The impact correlations are determined by the impact chain engine 200 utilizing an impact correlation algorithm. The impact chain engine 200 uses the impact correlation algorithm to analyze the impact chains 202 and to determine impact correlations 204.

Several examples of impact correlations include: an increase in Box 1 of a W2 will qualitatively decrease the likelihood of qualifying for the earned income credit ("EIC"), quantitatively increase the taxable income, and have little or no impact on marital status. The impact correlations 204 may be used for many of the same purposes as the impact chains 202, including testing and identifying programming errors in the tax preparation software 100, identifying whether tax topics are irrelevant to each other, and individualizing the user experience in using the tax preparation system 40 to prepare a tax return, as described below.

For instance, tax preparation system 40 may be configured to use the impact correlations 204 (and/or the impact chains 202) to determine the relative relevance of tax topics and tax questions. As an example, the TLA 60 may be configured to use the impact correlations in determining which tax topics and/or tax questions to suggest to the user interface manager 82, which in turn determines question(s) to present to the user. Thus, the system 40 can utilize the impact correlations 204 to eliminate irrelevant steps and information processing by only considering those tax topics and questions which are relevant, or most relevant to the situation of the particular taxpayer.

The impact chains 202 may also be utilized to identify whether tax topics are irrelevant to each other. In other words, the impact chain engine 200 can determine whether a first tax topic has no affect on, and/or is not affected by, a second tax topic. For example, using the impact chains 202, the impact chain engine 200 can determine that a taxpayer's social security number is irrelevant to a taxpayer's number of dependents. As another example using the impact chains shown in FIGS. 6A and 6D, impact chain 202a (see FIG. 6A) and impact chain 202d (see FIG. 6D) indicate that a taxpayer's earned income credit ("EIC") does not affect, and is not affected by, the taxpayer's zip code.

The impact chains 202 may also be utilized to perform automatic coverage detection and automatic test case filtering of the tax preparation software 100 and/or the tax calculation graphs 14. Automatic coverage detection means testing the software 100 and/or tax calculation graphs 14 to determine that all of the nodes for a target tax concept, including input nodes 24, functional nodes 26 and/or function nodes 28, are properly programmed. For instance, the impact chain engine 200 may be configured to use an impact chain 202 to construct a group of thorough test suites which includes all of the variations of the input nodes 24 for a target tax topic. The system 40 may be configured to execute a test program to run through the test suites with a plurality of test cases of tax data to check that the tax calculations for the target tax matter are properly executing and providing the correct results. As an example, for the tax concept of determining a taxpayer's status as exempt from the ACA penalty, the impact chain 202d (see FIG. 6D) may be utilized to construct a group of test suites which include all of the variations of the input nodes 24 for determining the exemption from the ACA penalty. The inputs include all of the input nodes 24 within the impact chain 202d. The system 40 and/or impact chain engine 200 may then execute the calculations for the impact chain 202d using a number of test cases, and the results can be check for accuracy. If there are errors in the results, then the programming can be debugged to correct the programming errors.

Automatic test case filtering involves filtering out any test cases that are irrelevant to a particular target tax topic. For example, the impact chain engine 200 may be configured to determine irrelevancies between tax topics using the impact chains 202 determined by the impact chain engine. For example, impact chain 202a (see FIG. 6A) and impact chain 202d (see FIG. 6D) indicate that a taxpayer's earned income credit ("EIC") does not affect, and is not affected by, the taxpayer's zip code. Therefore, when testing the target tax concept of the earned income credit ("EIC") using the impact chain 202a, the impact chain engine 202 can filter out any test cases that are irrelevant to the earned income credit, including the test cases which vary the zip code in order to test for programming errors.

The impact chains 202 may also be used in generating and providing explanations for the results of the tax calculations, tax results and tax operations 29 using an explanation engine 110. Referring again to FIG. 7, the system 40 includes an explanation engine 110 that operates within the tax preparation software 100 to generate a narrative explanation from the one or more explanations associated with a particular tax operation 29 (illustrated in FIGS. 6A-6D). To generate the narrative explanation for a particular tax operation 29, the explanation engine 110 extracts the stored function 28 that is associated with the particular functional node 26. The stored function 28 is one function of a defined set and may be associated with a brief explanation. For example, a "cap" function may be associated with an explanation of "value exceeds cap." This brief explanation can be combined with a stored explanation or narrative that is associated with the particular functional node 26 within the calculation graph 14. For example, the functional node 26 paired with the stored "cap" function 28 gives a contextual tax explanation that is more than merely "value exceeds cap." For instance, a pre-stored narrative associated with the particular functional node 26 having to do with the child tax credit within the calculation graph 14 may be a complete statement or sentence such as "You cannot claim a child tax credit because your income is too high." In other embodiments, the pre-stored narrative may be only a few words or a sentence fragment. In the above example, the pre-stored narrative may be "credit subject to income phase out" or "AGI too high." A particular functional node 26 and associated function 28 may have multiple pre-stored narratives. The particular narrative(s) that is/are associated with a particular functional node 26 and associated function 28 may be stored in entries 112 in a data store or database such as data store 42 of FIG. 7. For example, with reference to FIG. 7, data store 42 contains the pre-stored narratives that may be mapped or otherwise tagged to particular functional nodes 26 and associated functions 28 contained within the calculation graph(s) 14. The locations or addresses of the various functional nodes 26 and the associated functions 28 can be obtained using the calculation graphs 14.

Figure 8A:
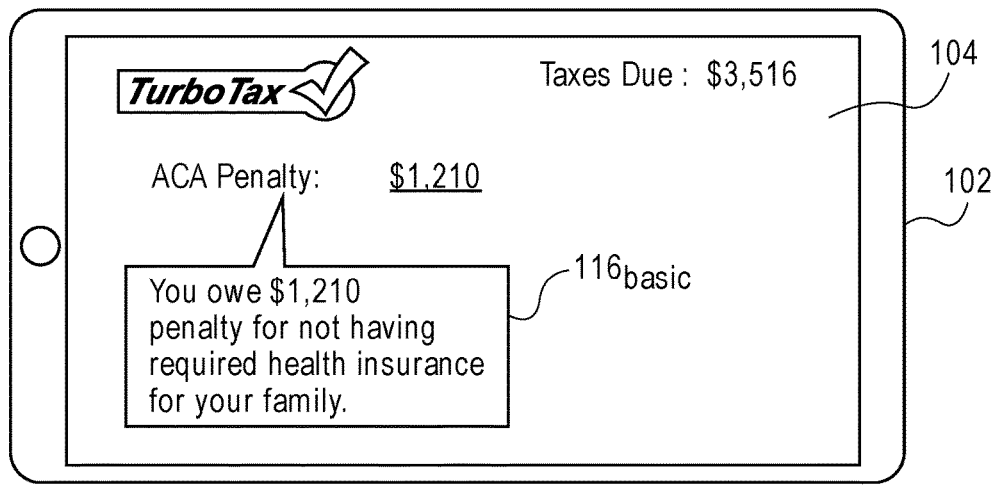
FIG. 8A illustrates a display of a computing device displaying a narrative explanation according to one embodiment.
Figure 8B:
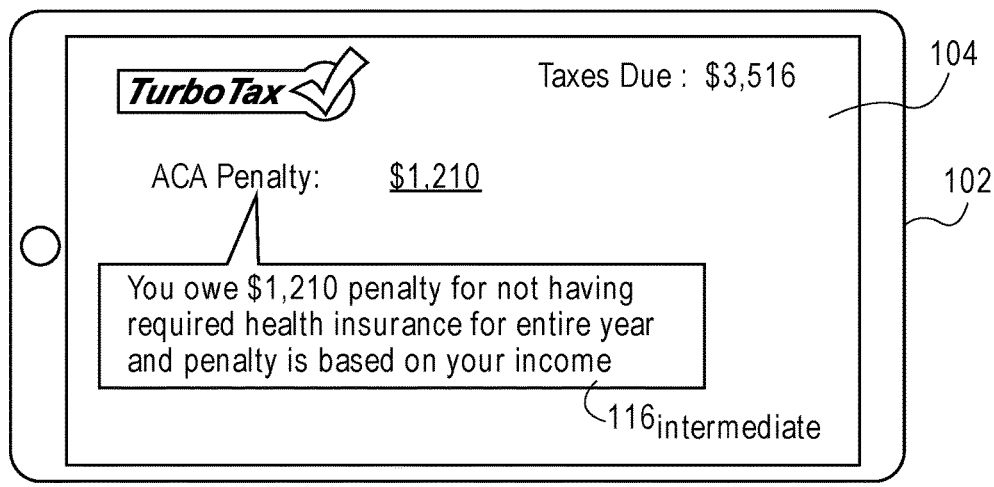
FIG. 8B illustrates a display of a computing device displaying a narrative explanation according to another embodiment.
Figure 8C:
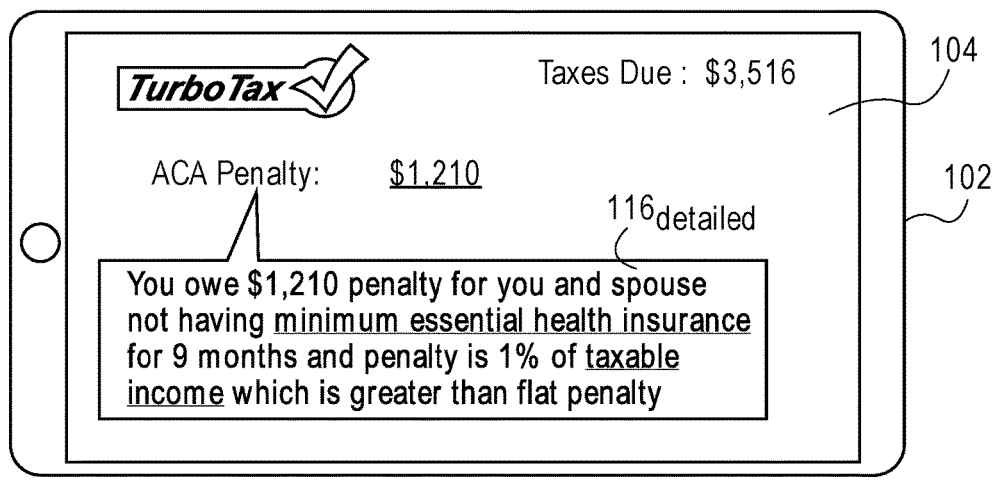
FIG. 8C illustrates a display of a computing device displaying a narrative explanation according to another embodiment.

These stored entries 112 can be recalled or extracted by the explanation engine 110 and then displayed to a user on a display 104 of a computing device 102, 103. For example, explanation engine 110 may interface with the UI control 80 in two-way communication such that a user may ask the tax preparation software 100 why a particular tax calculation, operation, or decision has been made by the system 40. For instance, the user may be presented with an on-screen link (FIGS. 10A, 10B, 11A, 11B, 12A, and 12B illustrate a hyperlink 120), button, or the like that can be selected by the user to explain to the user why a particular tax calculation, operation, or decision was made by the tax preparation software 100. For example, in the context of FIG. 6D described herein, a user may see an ACA penalty of $1,210.00 listed on the screen of the computing device 102, 103 while he or she is preparing the tax return for a prior year. FIGS. 8A-8C illustrate an example of such a screen shot. The taxpayer may be interested in why there is such a penalty. As one example, the initial explanation provided to the user may be "you have an ACA penalty because you, your spouse, and your two child dependents did not have coverage during the 2014 calendar year and the penalty is based on your income." This explanation may be associated with, for example, function node 26 and function 28 pair B in FIG. 6D.

As shown in FIG. 7, the explanation engine 110 utilizes the impact chains 202 in order to generate the explanations, such as to provide additional levels of detailed explanations. In this way, a user is able to further "drill down" with additional questions to gain additional explanatory detail. This additional level of detailed explanations is possible by traversing the impact chain 202 to identify each of the preceding or upstream nodes which impact the target tax topic for which an explanation is being provided, including each of the input node(s) 24, function node(s) 26 and function node(s) 28 along the impact chain 202. In the context of the example listed above as shown in FIG. 6D, the impact chain engine 200 has determined an impact chain 202e, commencing at the node D entitled "ACA Penalty Applies." A user may not be satisfied with the initial explanation described above, and may want additional explanation. In this instance, for example, the word "income" may be highlighted or linked with a hyperlink. A user clicking on this would then be provided with additional explanation on the detail regarding the ACA penalty. In this example, the user may be provided with "Under the ACA your penalty is the greater of 1% of your taxable income or a fixed dollar amount based on your family circumstances. In your situation, the 1% of taxable income exceeded the fixed dollar amount." This particular explanation may be associated with the predecessor function node 26 and function 28 pair A in FIG. 6D. Additional details may be provided by traversing the impact chain 202e (see FIG. 6D) commencing at the target tax topic, in this case, the ACA Penalty Applies node D.

With reference to FIG. 7, the explanation engine 110 may also automatically generate explanations that are then communicated to the user interface manager 82. The automatically generated explanations may be displayed on a display associated with the computing devices 102, 103. In some embodiments, the explanations may be contemporaneously displayed alongside other tax data and/or calculations. For example, as a user inputs his or her information into the tax preparation software 100 and calculations are automatically updated, explanations may be automatically displayed to the user. These explanations may be displayed in a side bar, window, panel, pop-up (e.g., mouse over), or the like that can be followed by the user. The explanations may also be fully or partially hidden from the user which can be selectively turned on or off as requested by the user.

In one aspect of the invention, the choice of what particular explanation will be displayed to a user may vary. For example, different explanations associated with the same function node 26 and function 28 pair may be selected by the explanation engine 110 for display to a user based on the user's experience level. A basic user may be given a general or summary explanation while a user with more sophistication may be given a more detailed explanation. A professional user such as a CPA or other tax specialist may be given even more detailed explanations. FIGS. 8A-8C illustrates three different explanations ($116_{basic}$, $116_{intermediate}$, $116_{detailed}$) that are displayed to different users that have various degrees of explanation. FIG. 8A illustrates a basic explanation $116_{basic}$. In this example, an explanation is provided by the taxpayer owes an ACA penalty of $1,210. FIG. 8B illustrates a more detailed explanation $116_{intermediate}$ of this same penalty. In the FIG. 8B example, the taxpayer is told additional reasons behind the penalty (i.e., required health insurance was not obtained for the entire tax year). In FIG. 8C, an even more detailed explanation $116_{detailed}$ is given which more closely tracks the actual function node 26 and function 28 that makes up the calculation graph 14. Note that in FIG. 8C various terms such as "minimum essential health insurance" which has a specific definition under U.S. tax code and regulations is linked so that the user can drill into even more detail. Likewise, taxable income is linked in this example, letting the user potentially drill even further into the calculation of the ACA penalty. While three such explanations 116 are illustrated in the context of FIGS. 8A-8C, additional levels of simplicity/complexity for the explanation can be used.

In some embodiments, the different levels of explanation may be tied to product types or codes. These may be associated with, for example, SKU product codes. For example, a free edition of the tax preparation software 100 may provide few or no explanations. In a more advanced edition (e.g., "Deluxe edition"), additional explanation is provided. Still more explanation may be provided in the more advanced editions of the tax preparation software 100 (e.g., "Premier edition"). Versions of the tax preparation software 100 that are developed for accountants and CPAs may provide even more explanation.

In still other embodiments a user may be able to "unlock" additional or more detailed explanations by upgrading to a higher edition of tax preparation software 100. Alternatively, a user may unlock additional or more detailed explanations in an a la carte manner for payment of an additional fee. Such a fee can be paid through the tax preparation software 100 itself using known methods of payment.

Figure 9:
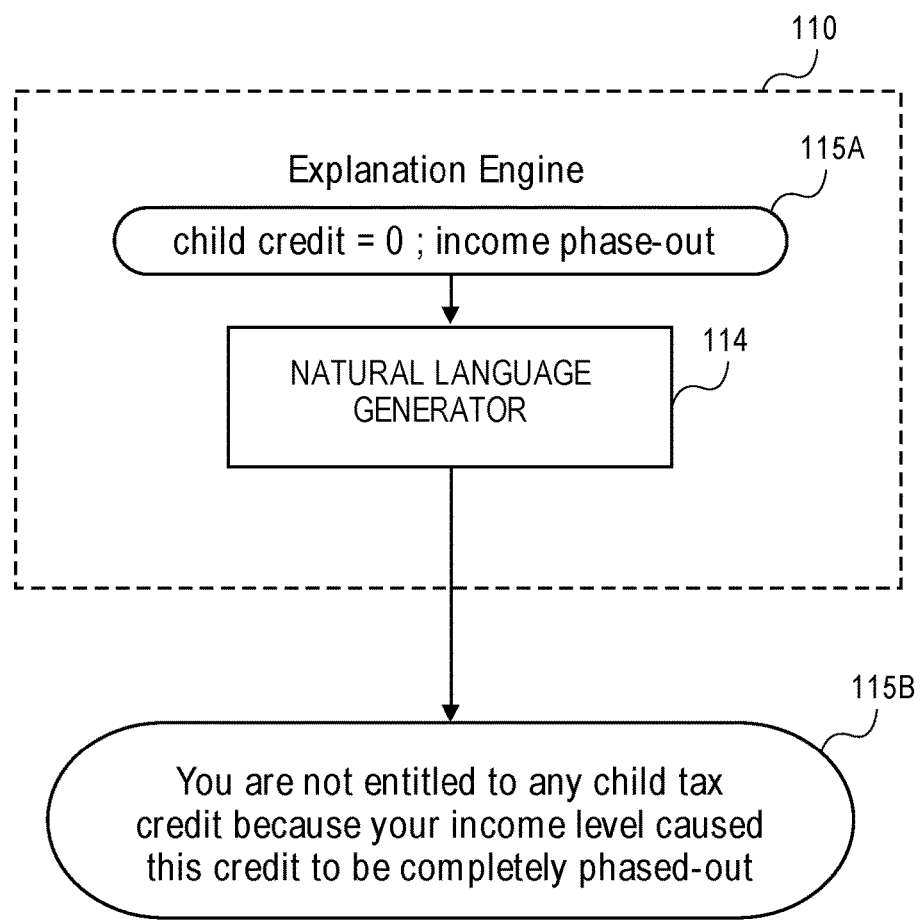
FIG. 9 illustrates an explanation engine that is part of the system of FIG. 7. The explanation engine generates narrative explanations that can be displayed or otherwise presented to users to explain one or more tax calculations or operations that are performed by the tax preparation software.

FIG. 9 illustrates additional details of the explanation engine 110 according to an embodiment of the invention. In this embodiment, the explanation engine 110 includes a natural language generator 114 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 26 and associated function 28. In the example of FIG. 9, a brief explanation 115A extracted by the explanation engine 110 which indicates that the child credit tax is zero due to phase out from income level is then subject to post-processing to convert the same into a more understandable sentence that can be presented to the user. In this example, the user is provided with a natural language explanation 115B that is more readily understood by users.

In one aspect of the invention, the natural language generator 114 may rely on artificial intelligence or machine learning such that results may be improved. For example, the explanation engine 110 may be triggered in response to a query that a user has typed into a free-form search box within the tax preparation software 100. The search that has been input within the search box can then be processed by the explanation engine 110 to determine what tax operation the user is inquiring about and then generate an explanatory response 115B.

Figure 10A:
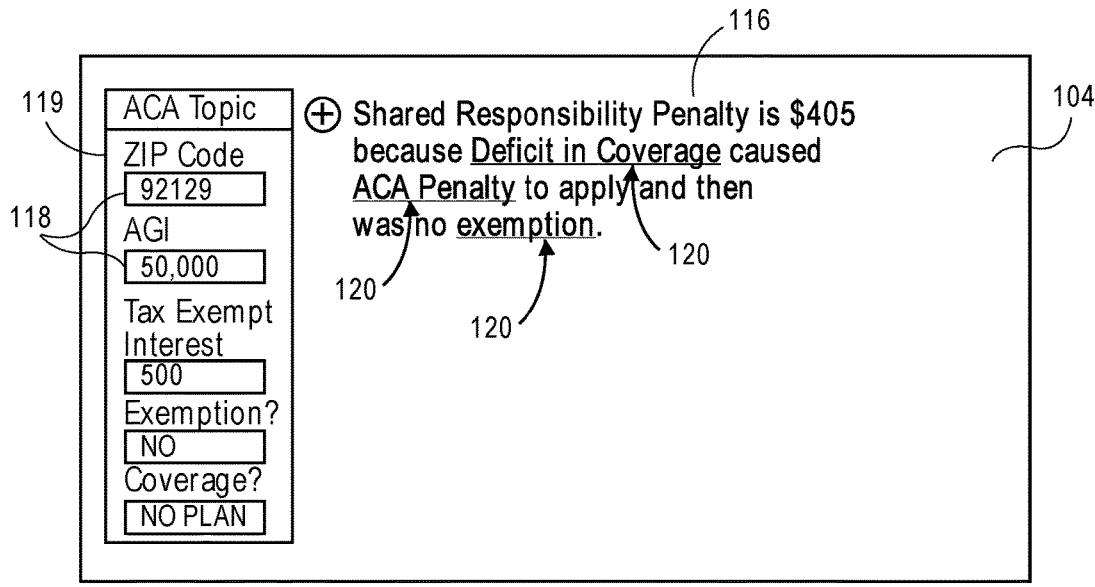
FIGS. 10A and 10B illustrate a display of a computing device displaying a narrative explanation that was generated by the explanation engine. The narrative explanation contains multiple phrases that are linked that can be selected to provide additional detailed explanations.
Figure 10B:
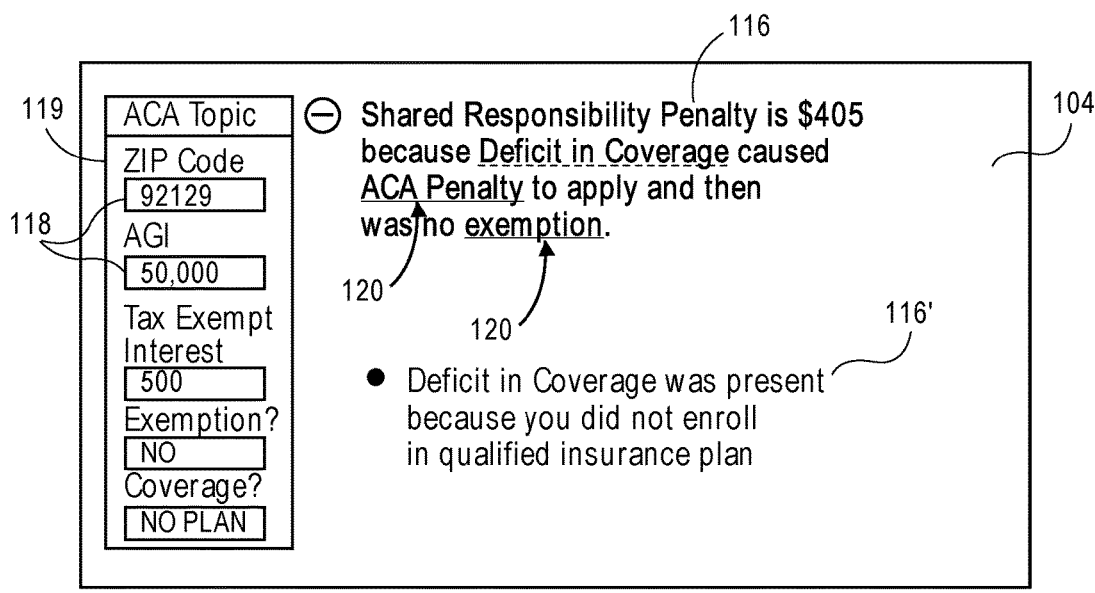

FIGS. 10A, 10B, 11A, 11B, 12A, and 12B illustrate various embodiments of how a narrative explanation 116 may be displayed to a user on a display 104 that is associated with a computing device 102, 103. FIGS. 10A and 10B illustrate an exemplary screen shot of a display 104 that contains a narrative explanation 116 of a tax operation. In this particular example, the tax operation pertains to the ACA shared responsibility penalty. As seen in the screen shot on display 104, the narrative explanation 116 may be presented along with additional tax data 118 that generally relates to the specific tax operation. In this example, a separate window 119 contains tax data 118 that relates to the tax operation or topic that is germane to the narrative explanation 116 that is being displayed. In this example, the taxpayer's zip code, AGI, tax exempt interest amount, exemption status, and insurance coverage status are illustrated. It should be understood, however, that the specific tax data 118 that is displayed may vary and many include more or less information. In addition, the tax data 118 may be hidden from view in other embodiments. Likewise, the tax data 118 does not have to be displayed in a separate window 119 or other area on the display 104. For example, the tax data 118 could be on a ribbon or pop-up window.

As seen in FIG. 10A, the narrative explanation 116 includes a plurality of words wherein several words or phrases are hyperlinked 120. In this regard, the narrative explanation 116 is nested as one or more phrases can be further expanded as is illustrated below. In this example, the narrative explanation 116 tells the user why the shared responsibility penalty was $405. Specifically, the narrative explanation 116 explains that the shared responsibility penalty is $405 because there was a deficit in coverage that causes the ACA penalty to apply and there was not exemption. The narrative explanation 116 in this example includes three phrases or words ("deficit in coverage"; "ACA Penalty"; "exemption") that are hyperlinked 120. A user can select a hyperlink 120 associated with one of these phrases or words where an additional narrative explanation 116' is given as illustrated in FIG. 10B. FIG. 10B illustrates a view of the display 104 after a user has selected the "deficit in coverage" phrase in FIG. 10A. As seen in FIG. 10B, the user is presented with another narrative explanation 116' explaining additional details on why there was a deficit in coverage for the taxpayer. Here, the user is told that a deficit in coverage was present because the taxpayer did not enroll in a qualified insurance plan during the year. As seen in FIG. 10B, the hyperlink 120 for "deficit in coverage" may change appearances upon being selected. For example, the hyperlink 120 may go from a solid line to a dashed line to indicate that it has been selected. Of course, other changes in appearance such as size, shape, highlighting can be used. Alternatively, the word or phrase of the hyperlink 120 may change appearances after being selected. For example, the word or phrase may change color, font size, or be highlighted to illustrate that the additional explanation 116' pertains to that specific word or phrase.

Figure 11A:
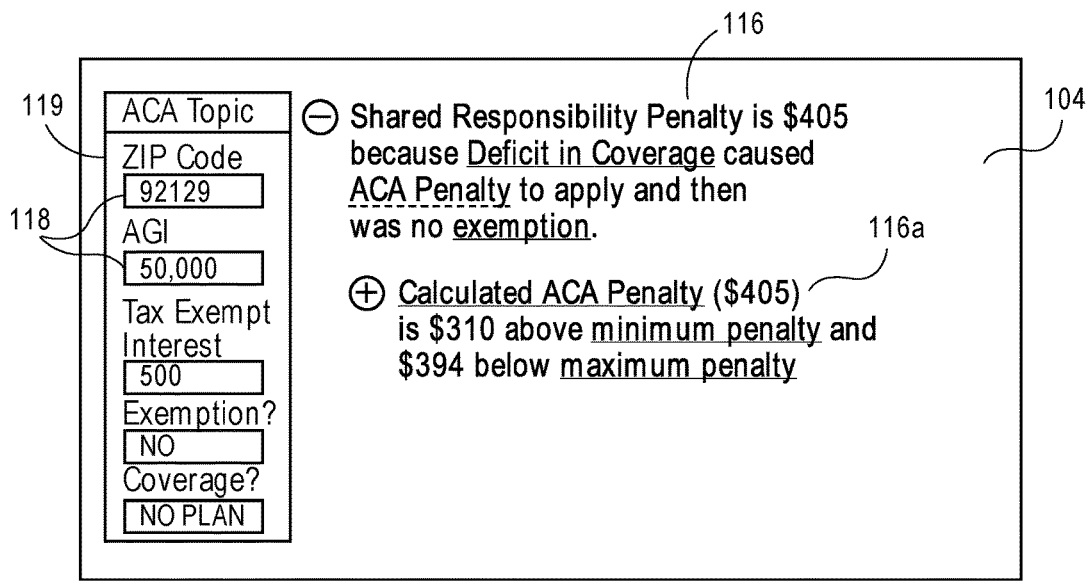
FIGS. 11A and 11B illustrate a display of a computing device displaying a narrative explanation that was generated by the explanation engine. The narrative explanation contains multiple phrases that are linked that can be selected to provide additional detailed explanations.
Figure 11B:
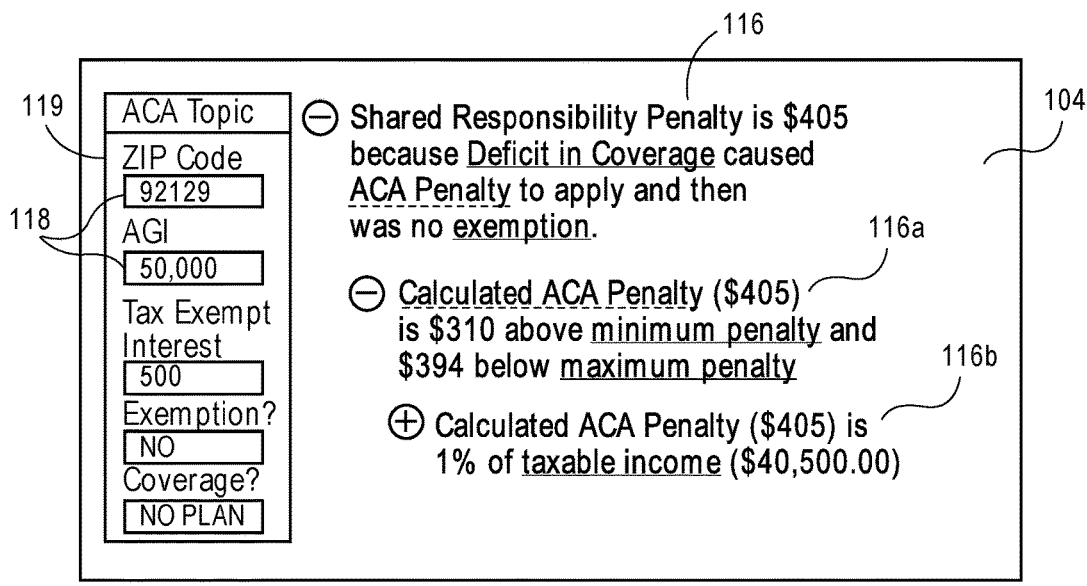

FIGS. 11A and 11B illustrate how the initial narrative explanation 116 can be expanded further a plurality of times. In this example, the initial narrative explanation 116 includes the phrase "ACA Penalty." A user may select the hyperlink 120 associated with this phrase that brings up another narrative explanation 116a that provides additional explanatory detail on the ACA penalty. In this example, the additional narrative explanation 116a itself includes several words or phrases with hyperlinks 120. In this example, "calculated ACA penalty," "minimum penalty," and "maximum penalty" are phrases that contain respective hyperlinks 120 where even additional explanation can be found. As seen in FIG. 11B, for example, a user that selects the hyperlink 120 that is associated with "calculated ACA penalty" returns another narrative explanation 116b that explains how the amount of the calculated ACA penalty was derived. In this example, the penalty was calculated as 1% of taxable income.

Figure 12A:
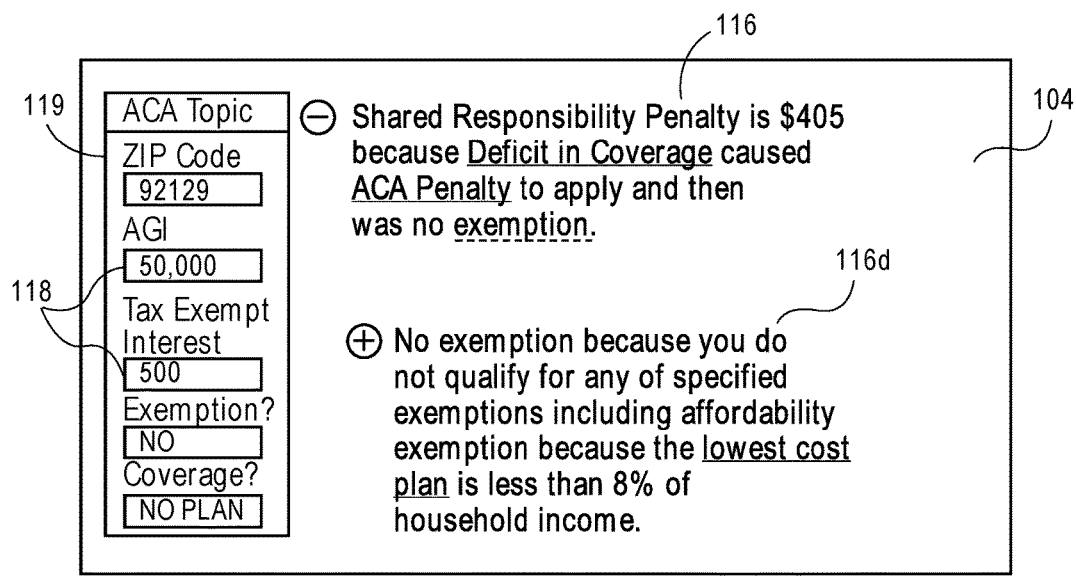
FIGS. 12A and 12B illustrate a display of a computing device displaying a narrative explanation that was generated by the explanation engine. The narrative explanation contains multiple phrases that are linked that can be selected to provide additional detailed explanations.
Figure 12B:
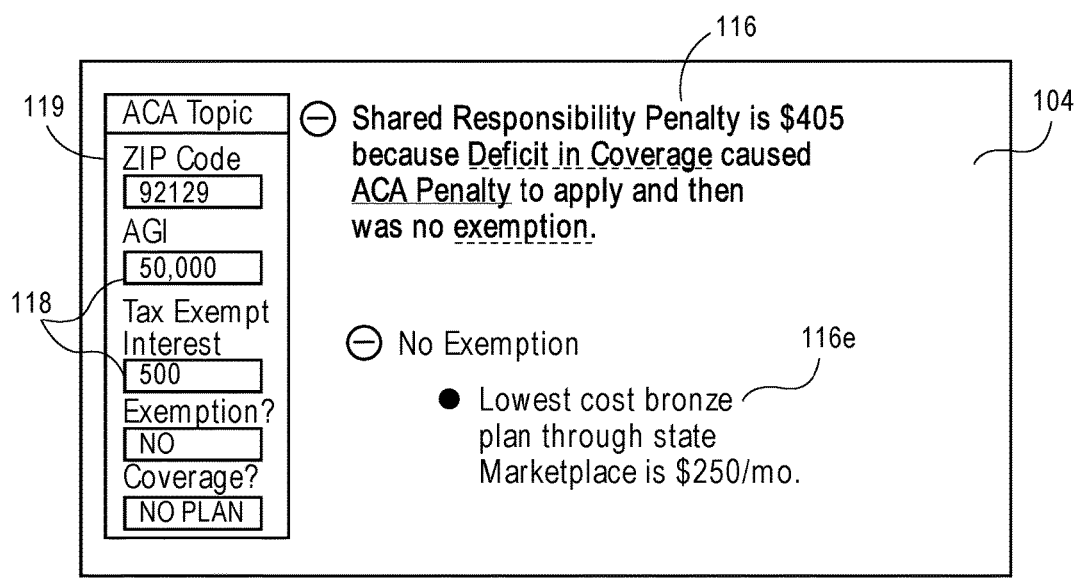

FIGS. 12A and 12B illustrate the same initial narrative explanation 116 as found in FIGS. 10A and 11A but with the hyperlinks 120 associated with the word "exemption" being selected. As seen in FIG. 12A, in narrative explanation 116d, the user is given an explanation that no exemption applies because the taxpayer did not qualify for any specified exemptions including the affordability exemption because the lowest cost plan, itself a defined phrase that has a hyperlink), is less than 8% of household income. FIG. 12B illustrates the same display 104 after a user has selected the hyperlink 120 that is associated with "lowest cost plan" which then displays that the lowest cost plan offered by the State in which the taxpayer resides is $250/month.

The narrative explanations 116 and their associated sub-explanations (e.g., 116', 116a, 116b, 116d, 116e) are constructed as an explanation tree with the root of the tree representing a particular tax topic or tax operation. In the example of FIGS. 10A, 10B, 11A, 11B, 12A, and 12B, the tax topic pertains to the ACA penalty. The explanation trees are readily constructed based on the impact chain 202e comprising each of the function nodes 26 and associated functions 28 within the impact chain 202e. For example, one is able to "drill down" into more detailed explanations by traversing the impact chain based on the relevant calculation graph 14. For example, the initial explanation 116 that is displayed on the screen may be associated with node D which commences the impact chain 202e for the calculation graph 14 of FIG. 6D. By selecting the ACA penalty hyperlink 120 as seen in FIGS. 11A and 11B, a predecessor node (e.g., node C) on the impact chain 202e is used to generate the narrative explanation 116a. Yet another predecessor node (node A) on the impact chain 202e is used to generate the narrative explanation of the calculated ACA penalty. In this manner, explanations can be presented to the user in a recursive manner by traversing the impact chain 202e. Conversely, traversing progressively top-down along an impact chain 202 shows how one node affects other downstream nodes.

Encapsulating the tax code and regulations within calculation graphs 14 results in much improved testability and maintainability of the tax preparation software 100. Software programming errors ("bugs") can be identified more easily when the calculation graphs 14 are used because such bugs can be traced more easily. In addition, updates to the calculation graphs 14 can be readily performed when tax code or regulations change with less effort.

Further, the degree of granularity in the narrative explanations 116 that are presented to the user can be controlled. As explained in the context of FIGS. 8A-8C, different levels of details can be presented to the user. This can be used to tailor the tax preparation software 100 to provide scalable and personalized tax explanations to the user. In addition, the narrative explanations 116 can be quickly altered and updated as needed given that they are associated with the calculation graphs and are not hard coded throughout the underlying software code for the tax preparation software 100.

Note that the impact chain engine 200 can determine an impact chain 202 by traversing a calculation graph 14 in any topologically sorted order. This includes starting at a leaf or other input node and working forward through the calculation graph 14. Alternatively, the impact chain engine 200 can start at the final or terminal node and work backwards. The impact chain engine 200 can also start at an intermediate node and traverse through the calculation graph 14 in any order.

By capturing the tax code and tax regulations in the calculation graph 14, targeted calculations can be done on various tax topics or sub-topics. For example, FIGS. 6C and 6D demonstrate a very isolated example of this where a calculation graph 14 is used to determine the amount, if any, of the ACA shared responsibility penalty. Of course, there are many such calculation graphs 14 for the various topics or sub-topics that make up the tax code. This has the added benefit that various tax topics can be isolated and examined separately in detail and can be used to explain intermediate operations and calculations that are used to generate a final tax liability or refund amount.

In operation of the system 40 to prepare a tax return, a user initiates the tax preparation software 100 on a computing device 102, 103 as seen, for example, in FIG. 13. The tax preparation software 100 may reside on the actual computing device 102 that the user interfaces with or, alternatively, the tax preparation software 100 may reside on a remote computing device 103 such as a server or the like as illustrated. In such an instances, the computing device 102 that is utilized by the user or tax payer communicates via the remote computing device 103 using an application 105 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

A user initiating the tax preparation software 100, as explained herein may import tax related information from one or more data sources 48. Tax data may also be input manually with user input 48a. The tax calculation engine 50 computes one or more tax calculations dynamically based on the then available data at any given instance within the schema 44 in the shared data store 42. In some instances, estimates or educated guesses may be made for missing data. Details regarding how such estimates or educated guesses are done maybe found in U.S. patent application Ser. No. 14/448,986 which is incorporated by reference as if set forth fully herein. As the tax preparation software 100 is calculating or otherwise performing tax operations, the system 40 may execute the impact chain engine 200 to analyze the tax calculation graphs and to determine impact chains and/or impact correlations. The system 40 may also utilize the impact chain 202 for any of the uses described above, such as individualizing the operation the user experience, and performing diagnostic functions like coverage detection and test case filtering. In addition, the explanation engine 110 is executing or made available to execute and uses the impact chain 202 to provide to the user one or more narrative explanations regarding calculations or operations being performed as referenced by particular functional nodes 26 and functions 28 contained within the calculation graph 14. As noted herein, in some instances, the narrative explanations are provided automatically to the UI control 80. In other instances, explanations are provided by the explanation engine 110 upon request of a user. For example, a user may request explanations on an as-needed basis by interfacing with the tax preparation software 100.

Figure 14:
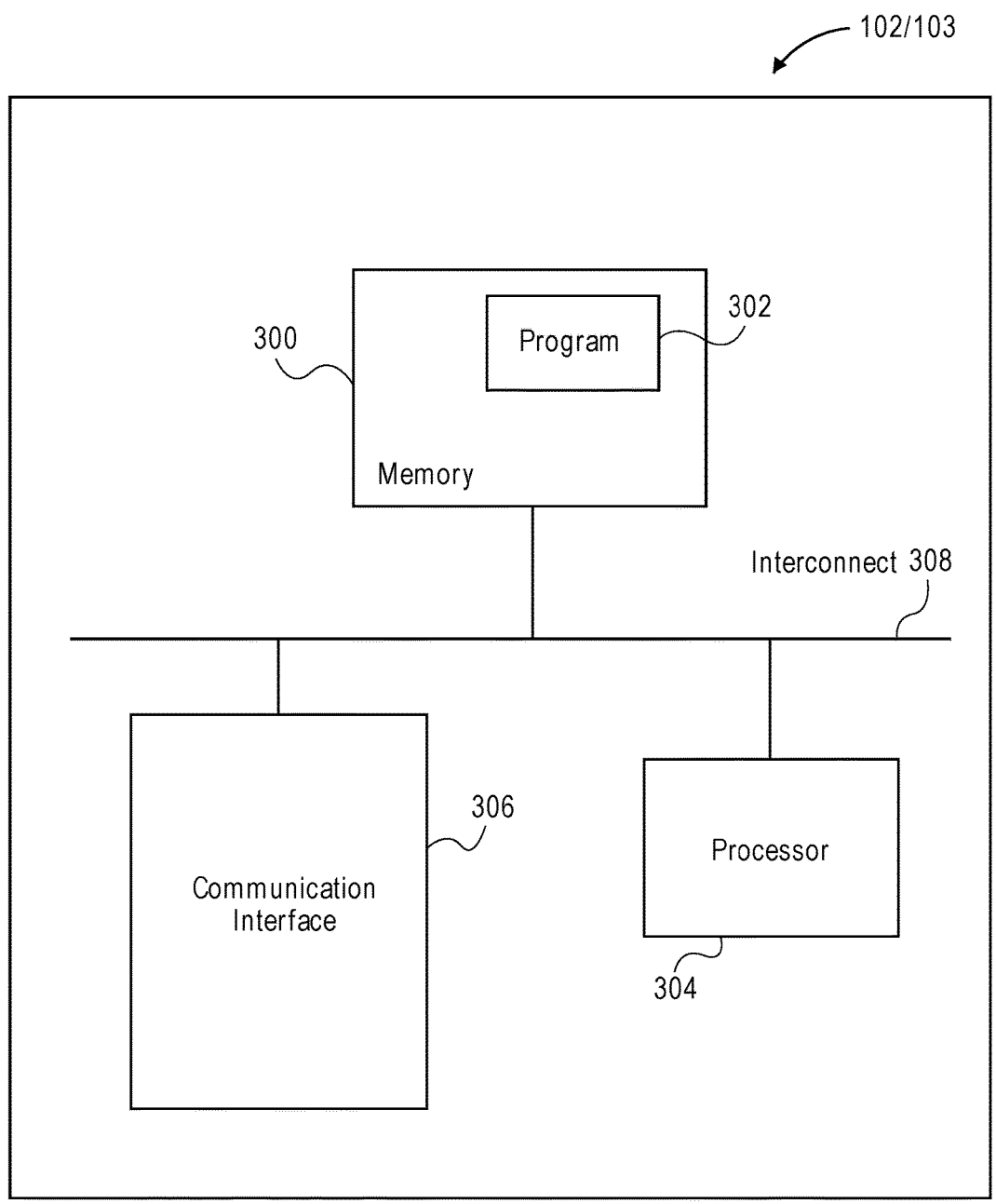
FIG. 14 illustrates generally the components of a computing device that may be utilized to execute the software for automatically calculating or determining tax liability and preparing a tax return based thereon.

FIG. 14 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 14 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium.

Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A system for preparing an electronic tax return in which the process is individualized for a particular taxpayer, comprising:
    a computing device having a computer processor and memory;
    a shared data store in communication with the computing device, the data store configured to store user-specific tax data therein;
    a tax preparation software application executable by the computing device, the tax preparation software application having a tax calculation engine, a tax calculation graph, and an impact chain engine, a tax logic agent, a plurality of decision tables, and a user interface manager;
    the tax calculation engine configured to read the user-specific tax data from the shared data store and write calculated tax data to the shared data store, the tax calculation engine configured to perform a plurality of tax calculation operations based on a tax calculation graph comprising a plurality of nodes including one or more of input nodes, functional nodes, and function nodes; and
    the tax calculation graph comprising a plurality of calculation paths wherein each calculation path connects a plurality of nodes which are data dependent such that a node is connected to another node if the node depends on the other node; and
    the impact chain engine configured to analyze the tax calculation graph and determine an impact chain for each of a plurality of nodes which are determined from the tax calculation graph, wherein an impact chain for a respective node consists of one of (a) each of the other nodes which are affected by the respective node, or (b) each of the other nodes which affect the respective node, the impact chain engine further configured to identify a first node in the impact chain which is relevant to a particular taxpayer based on the taxpayer's tax data stored in the shared data store and determine respective relevancy scores for one or more tax questions based on the impact chain;
    the plurality of decision tables collectively representing a completion graph for completing all required data fields for computing a tax return, each decision table representing a plurality of columns wherein each column corresponds to a tax question and a plurality of rows wherein each row corresponds to a completion path for a tax rule, thereby forming a plurality of cells with each cell corresponding to a particular row and column, each cell in a respective row having a logic operator corresponding to the tax question of each cell's respective column such that completion of each respective row is determined by the logic operators in the respective row;
    the tax logic agent configured to:
        access the user-specific tax data in a shared data store for the particular taxpayer;
        analyze the user-specific tax data for the particular taxpayer and traverse the decision tables to determine one or more suggested tax questions for obtaining missing tax data required to complete the tax return; and
        determine a relevancy ranking for each of the suggested tax questions using the relevancy scores for the one or more tax questions;
    the user interface manager configured to:
        receive the suggested tax questions and relevancy rankings, determine a tax question to be presented to a user for completing a tax return and generating an interview screen having the tax question to be presented to a user based at least in part upon the suggested tax matters and the relevancy rankings of the tax return preparation system based at least in part upon the suggested tax matters and the relevancy rankings, the user interface manager being detached from the tax logic agent such that the interview screen is not rigidly defined by the tax logic agent.

2. The system of claim 1, wherein the impact chain engine is configured to determine the plurality of impact chains at a design time during development of the tax preparation software application.

3. The system of claim 1, wherein the impact chain engine is configured to determine the plurality of impact chains during run-time of the tax preparation software application in preparing a tax return.

4. The system of claim 1, wherein the impact chain engine is configured to determine the plurality of impact chains at a design time during development of the tax preparation software application, and during run-time of the tax preparation software application in preparing a tax return.

5. The system of claim 1, wherein the impact chain engine is configured to determine the impact chains by commencing at a first node and then determining each preceding node which can affect the result of the first node.

6. The system of claim 1, wherein a plurality of the nodes are each associated with an explanation of a result of the respective node.

7. The system of claim 6, further comprising an explanation engine within the tax calculation software application, the explanation engine configured to generate a narrative explanation based at least in part on the explanations associated with the nodes.

8. The system of claim 7, wherein a plurality of the nodes are each associated with a reason for a result obtained by execution of the node.

9. The system of claim 8, wherein the tax preparation software application is configured to store the reason for a result obtained from execution of the nodes upon execution of the nodes by the tax calculation engine.

10. The system of claim 9, wherein the tax preparation software application is configured to generate the narrative explanation based at least in part on the reasons for the results.

11. A computer-implemented method comprising:
a tax calculation engine accessing a tax calculation graph, the tax calculation graph comprising a plurality of nodes including one or more of input nodes, functional nodes, and function nodes, and a plurality of calculation paths wherein each calculation path connects a plurality of nodes which are data dependent such that a node is connected to another node if the node depends on the other node;
the tax calculation engine reading user-specific tax data from a shared data store and performing a plurality of tax calculation operations based on a tax calculation graph using the user-specific tax data and writing calculated tax data to the shared data store;
an impact chain engine analyzing the tax calculation graph and determining a plurality of impact chains from the tax calculation graph by, wherein an impact chain for a respective node consists of one of (a) each of the other nodes which are affected by the respective node, or (b) each of the other nodes which affect the respective node
the impact chain engine identifying a first node in the impact chain which is relevant to a taxpayer based on the taxpayer's tax data stored in the shared data store and determining respective relevancy scores for one or more tax questions based on the impact chain;
a tax logic agent accessing a plurality of decision tables representing a completion graph for completing all required data fields for computing a tax return, each decision table representing a plurality of columns wherein each column corresponds to a tax question and a plurality of rows wherein each row corresponds to a completion path for a tax rule, thereby forming a plurality of cells with each cell corresponding to a particular row and column, each cell in a respective row having a logic operator corresponding to the tax question of each cell's respective column such that completion of each respective row is determined by the logic operators in the respective row, wherein each cell is related to a node on the tax calculation graph;
the tax logic agent analyzing the user-specific tax data for the particular taxpayer and traversing the decision tables using the user-specific tax data to determine one or more suggested tax questions for obtaining missing tax data required to complete the tax return; and
the tax logic agent determining a relevancy ranking for each of the suggested tax questions using the relevancy scores for the one or more tax questions;
a user interface manager receiving the suggested tax questions and relevancy rankings, determining a tax question to be presented to a user for completing a tax return and generating an interview screen having the tax question to be presented to a user based at least in part upon the suggested tax matters and the relevancy rankings, the user interface manager being detached from the tax logic agent such that the interview screen is not rigidly defined by the tax logic agent.

12. The method of claim 11, wherein the impact chain engine is executed at a design time during development of the tax preparation software application.

13. The method of claim 11, wherein the impact chain engine is executed during run-time of the tax preparation software application in preparing a tax return.

14. The method of claim 11, wherein the tax preparation system is executed at a design time during development of the tax preparation software application, and during run-time of the tax preparation software application in preparing a tax return.

15. The method of claim 11, wherein the impact chain engine determines the impact chains by commencing at a first node and then determining each preceding node which can affect the result of the first node.

16. The method of claim 11, further comprising:
an explanation engine within the tax preparation software application generating a narrative explanation based at least in part on explanations of a result of the nodes associated with each of the nodes.

17. The method of claim 11, wherein a plurality of the nodes are each associated with a reason for a result obtained by execution of the node, the method further comprising:
the tax preparation system executing the calculation engine to execute the nodes and storing a reason for a result obtained from the execution of the nodes.

18. The method of claim 17, further comprising:
the explanation engine generating the narrative explanation based at least in part on the reasons for the results.

* * * * *